US012432767B2

(12) United States Patent
Christopherson

(10) Patent No.: US 12,432,767 B2
(45) Date of Patent: *Sep. 30, 2025

(54) SYSTEM AND METHOD FOR INTERFERENCE PATTERN IDENTIFICATION

(71) Applicant: Verizon Patent and Licensing Inc., Basking Ridge, NJ (US)

(72) Inventor: Corey J Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,716

(22) Filed: Feb. 12, 2024

(65) Prior Publication Data
US 2024/0188118 A1 Jun. 6, 2024

Related U.S. Application Data

(63) Continuation of application No. 17/476,000, filed on Sep. 15, 2021, now Pat. No. 11,937,287.

(51) Int. Cl.
*H04W 16/22* (2009.01)
*G06N 20/00* (2019.01)
(Continued)

(52) U.S. Cl.
CPC .......... *H04W 72/542* (2023.01); *G06N 20/00* (2019.01); *H04B 17/318* (2015.01); *H04W 4/021* (2013.01)

(58) Field of Classification Search
CPC .......... G06N 3/02; G06N 3/042; G06N 3/044; G06N 3/0442; G06N 3/045; G06N 3/0455;
(Continued)

(56) References Cited

U.S. PATENT DOCUMENTS 9,843,347 B2* 12/2017 Botchway ................ H04B 1/10
11,349,582 B2* 5/2022 Yun ........................ H04W 24/08
(Continued)

OTHER PUBLICATIONS

Grimaldi et al., Autonomous Interference Mapping for Industrial Internet of Things Networks Over Unlicensed Bands, IEEE, 12 pages, Dec. 16, 2020.*
(Continued)

*Primary Examiner* — Frank Duong

(57) ABSTRACT

One or more computing devices, systems, and/or methods for identifying interference patterns associated with wireless communication sites and/or grouping wireless communication sites based upon identified interference patterns are provided. In an example, signal strength information associated with a wireless communication site communicating with a user equipment (UE) may be determined. An interference pattern representation of one or more interference patterns associated with the wireless communication site may be generated based upon the signal strength information. A plurality of wireless communication sites, including the wireless communication site, may be grouped into groups of wireless communication sites based upon interference pattern representations associated with the plurality of wireless communication sites. The interference pattern representations include the interference pattern representation.

20 Claims, 18 Drawing Sheets

(51) Int. Cl.
*H04B 17/318* (2015.01)
*H04W 4/021* (2018.01)
*H04W 72/542* (2023.01)

(58) Field of Classification Search
CPC ...... G06N 3/0464; G06N 3/0499; G06N 3/08; G06N 3/088; G06N 3/09; G06N 3/091; G06N 3/092; G06N 5/04; G06N 20/00; G06N 20/10; H04B 1/1027; H04B 17/27; H04B 17/345; H04B 17/318; H04B 17/3912; H04B 17/3913; H04L 25/0254; H04L 25/03165; H04L 2012/05686; H04L 2025/03464; H04L 41/145; H04L 41/16; H04L 45/08; H04W 4/021; H04W 16/18; H04W 16/22; H04W 24/02; H04W 24/06; H04W 24/08; H04W 52/24; H04W 64/00; H04W 72/542
See application file for complete search history.

(56) References Cited

U.S. PATENT DOCUMENTS

| | | | |
|---|---|---|---|
| 11,394,475 | B1 | 7/2022 | Vaca et al. |
| 11,558,132 | B2 * | 1/2023 | Borges ................... H04B 17/27 |
| 11,705,931 | B2 | 7/2023 | Botchway et al. |
| 2018/0103408 | A1 | 4/2018 | Amini et al. |
| 2018/0323815 | A1 | 11/2018 | Beadles et al. |
| 2019/0303752 | A1 | 10/2019 | Mercier et al. |
| 2020/0059800 | A1 * | 2/2020 | Menon ................... H04L 41/16 |
| 2020/0404523 | A1 * | 12/2020 | Yoon ..................... H04B 17/318 |
| 2023/0189315 | A1 * | 6/2023 | Haustein ............... H04W 24/02 370/252 |

OTHER PUBLICATIONS

Coles, Using Machine Learning Methods to Aid Scientists in Laboratory Environments, Thesis, Ontario Tech University, 153 pages, Dec. 2019.*

* cited by examiner

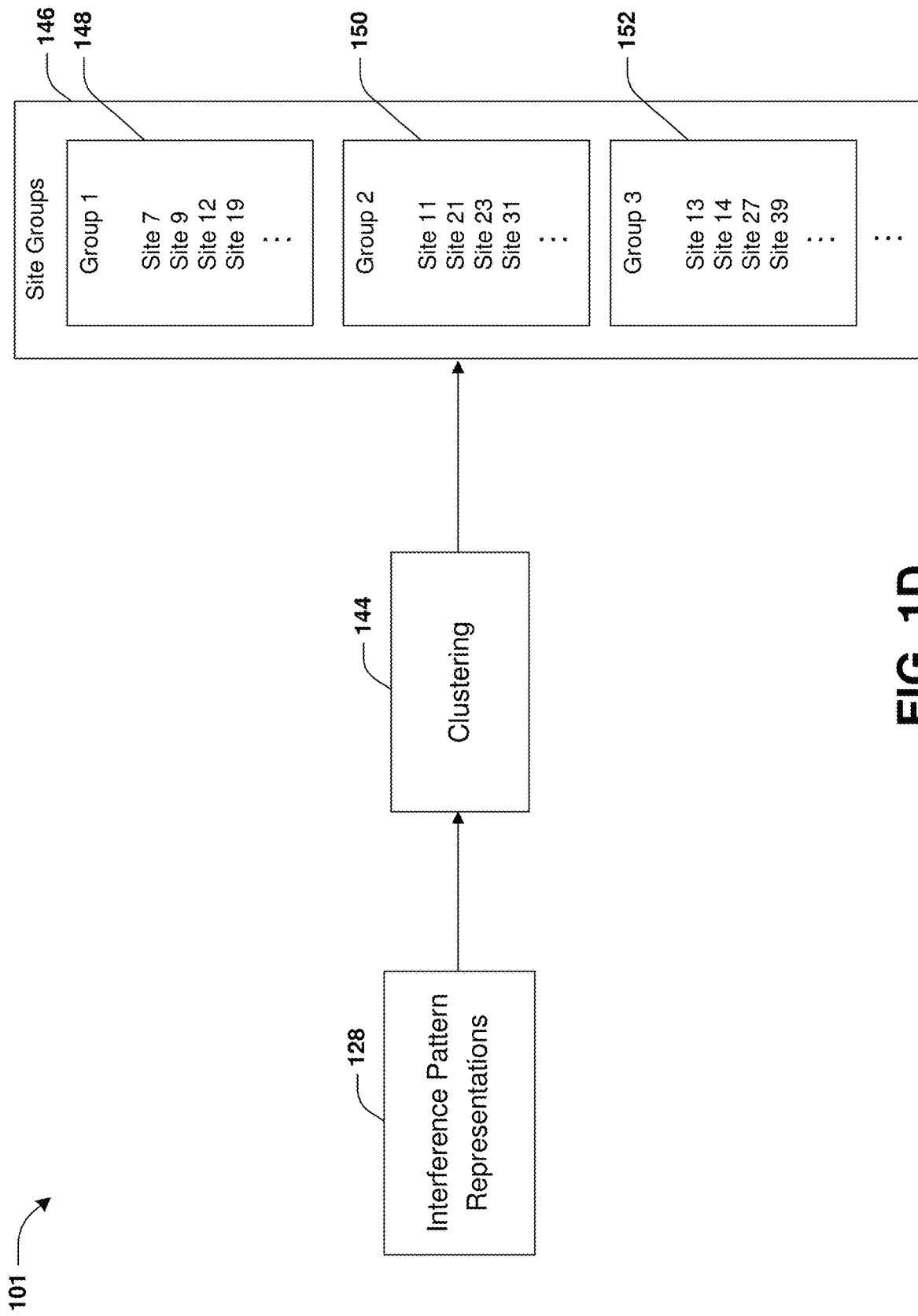

SYSTEM AND METHOD FOR INTERFERENCE PATTERN IDENTIFICATION

RELATED APPLICATION

This application claims priority to and is a continuation of U.S. application Ser. No. 17/476,000, filed on Sep. 15, 2021, entitled "SYSTEM AND METHOD FOR INTERFERENCE PATTERN IDENTIFICATION", which is incorporated by reference herein in its entirety.

BACKGROUND

A base station may wirelessly communicate with a user equipment (UE). However, interference sources may introduce interference that can degrade performance and/or capacity associated with wireless communication between the base station and the UE.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1D is a diagram illustrating an example system for identifying interference patterns associated with wireless communication sites and/or grouping wireless communication sites based upon identified interference patterns, where wireless communication sites are grouped into a plurality of groups of wireless communication sites according to some embodiments.

DETAILED DESCRIPTION OF EXAMPLE EMBODIMENTS

Figure 1A:
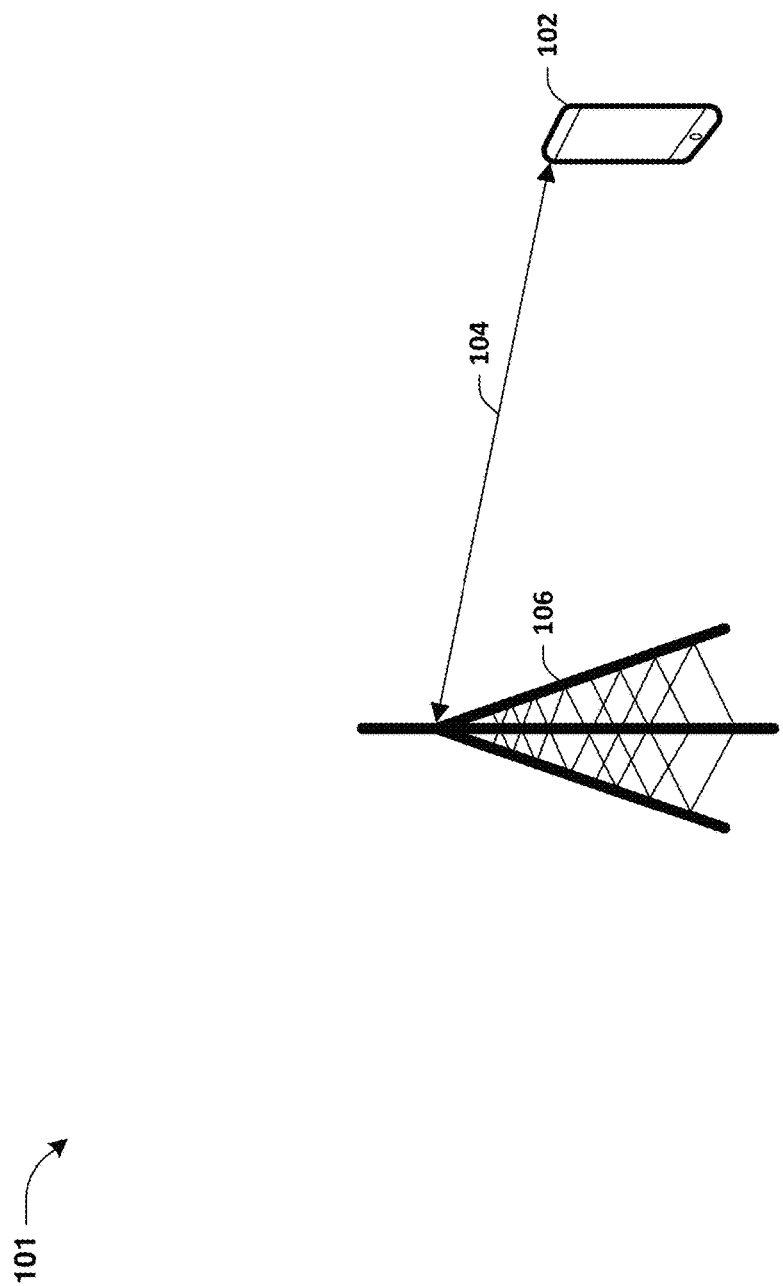
FIG. 1A is a diagram illustrating an example system of a wireless communication site communicating with a user equipment according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for identifying interference patterns associated with wireless communication sites and/or grouping wireless communication sites based upon identified interference patterns are provided. Wireless communication sites may wirelessly communicate with devices, such as user equipment (UE). For example, a UE may be able to access a network (e.g., a packet-switched network, such as an IP network and/or the Internet), place a telephone call, send and/or receive messages (e.g., text messages), etc. by wirelessly communicating with a wireless communication site. However, interference sources may introduce interference that can degrade performance and/or capacity associated with wireless communication between a base station and the UE. Identification of interference patterns of wireless communication systems and/or grouping wireless communication sites based upon identified interference patterns may be beneficial for at least one of tracking interference sources, mitigating interference to wireless communication sites, etc. In some systems, maps (e.g., signal strength maps) associated with wireless communication sites may be manually viewed to identify interference associated with wireless communication sites. In these systems, some interference patterns may not be identified or may be mistakenly identified (due to difficulty in manually identifying interference using maps, for example). Thus, identifying interference patterns and/or grouping wireless communication sites in these systems may be impossible or inaccurate. Alternatively and/or additionally, identifying interference sources associated with the interference patterns and/or taking corrective action to mitigate the interference sources may be a time-consuming process.

Accordingly, as provided herein, a wireless communication site receives signals that may be impacted by one or more interference sources. Signal strengths of the signals are measured and used to identify patterns of interference caused by the one or more interference sources. The interference patterns may be represented by a vector representation or other type of representation, for example. Representations of interference patterns are then used to place wireless communication sites into various groups. Each group may, for example, include wireless communication sites with related interference patterns.

In some examples, the location of an interference source associated with a group of wireless communication sites may be determined based upon the locations of the group of wireless communication sites. Alternatively and/or additionally, one or more types of equipment associated with the source of interference may be determined based upon interference pattern representations associated with the group of wireless communication sites. Once identified, one or more corrective actions may be performed to mitigate the source of interference based upon the types of equipment and/or the interference location. For example, the source of interference may be identified based upon the equipment type and/or the interference location. Alternatively and/or additionally, the equipment determined to be the source of interference may be checked, deactivated and/or replaced to mitigate and/or prevent the interference. Alternatively and/or additionally, one or more settings and/or parameters of the equipment determined to be the interference source may be modified (e.g., automatically modified) to mitigate and/or prevent the interference.

Accordingly, using one or more of the techniques herein, interference patterns may be identified and wireless communication sites may be placed into groups of wireless communication sites, automatically and with increased speed, lower cost and with less manual effort. Alternatively and/or additionally, sources of interference may be identified and one or more corrective actions may be performed automatically with increased speed and efficiency. By identifying sources of interference and performing one or more corrective actions (to mitigate a source of interference, for example) with increased speed, network performance of wireless communication sites may be improved.

FIGS. 1A-1L illustrate examples of a system 101 for identifying interference patterns associated with wireless communication sites and/or grouping wireless communication sites based upon identified interference patterns. FIG. 1A illustrates a first wireless communication site 106 communicating with a user equipment (UE) 102 (e.g., at least one of a phone, a laptop, a computer, a wearable device, a smart device, a television, any other type of computing device, an IoT device, an autonomous vehicle, hardware, etc.). For example, signals 104 (e.g., uplink signals and/or downlink signals) may be transmitted between the first wireless communication site 106 and the UE 102. The first wireless communication site 106 may provide network coverage to UEs comprising the UE 102. For example, the UEs may be provided with telecommunication services by the first wireless communication site 106, such as at least one of cellular service (e.g., 5G service, 4G service and/or other type of cellular service), internet service (e.g., cellular internet service, satellite internet service, 5G internet service, and/or other type of internet service), messaging service, etc. In an example, the first wireless communication site 106 may be (and/or may comprise) at least one of an antenna, an antenna branch, a base station, an antenna tower, a transmission and/or reception point (TRP), etc.

Figure 1B:
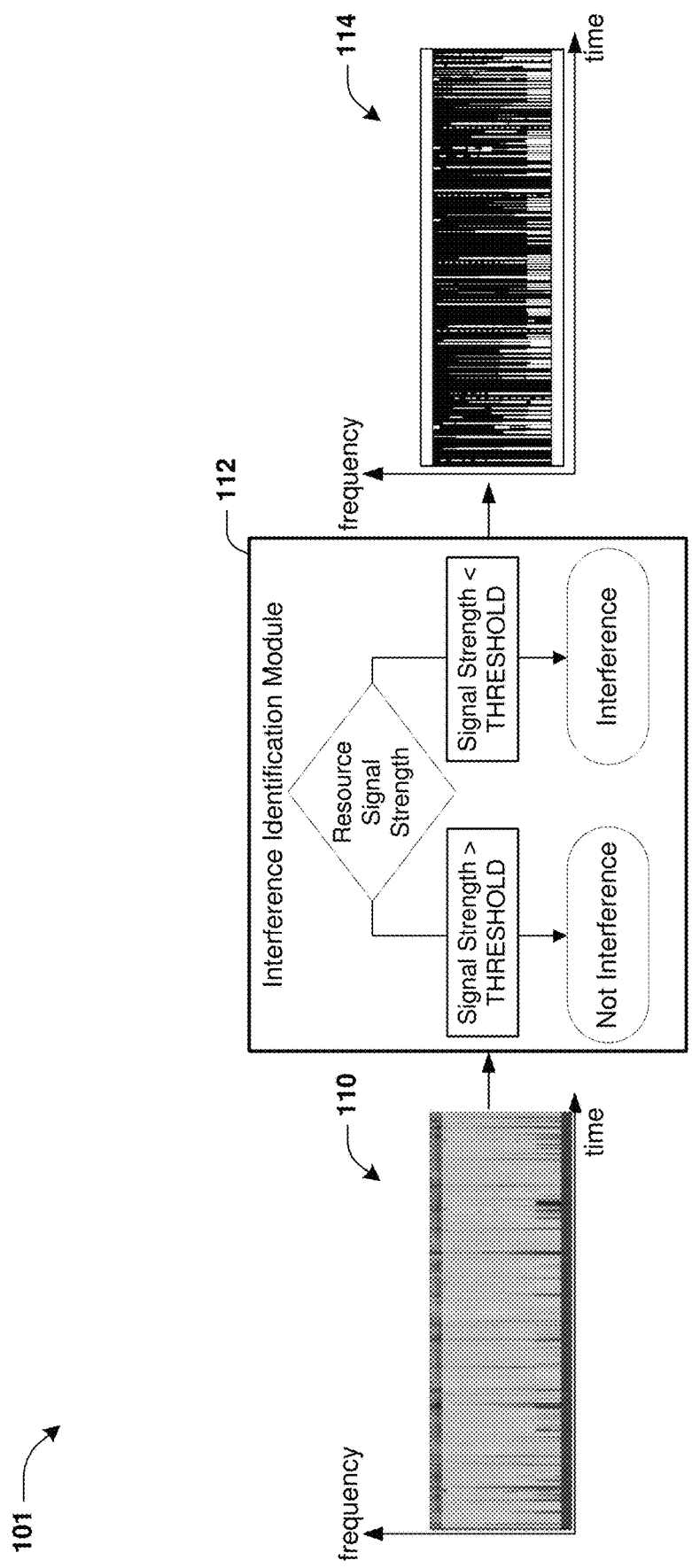
FIG. 1B is a diagram illustrating an example system for identifying interference patterns associated with wireless communication sites and/or grouping wireless communication sites based upon identified interference patterns, where first resource interference information is determined according to some embodiments.
Figure 1C:
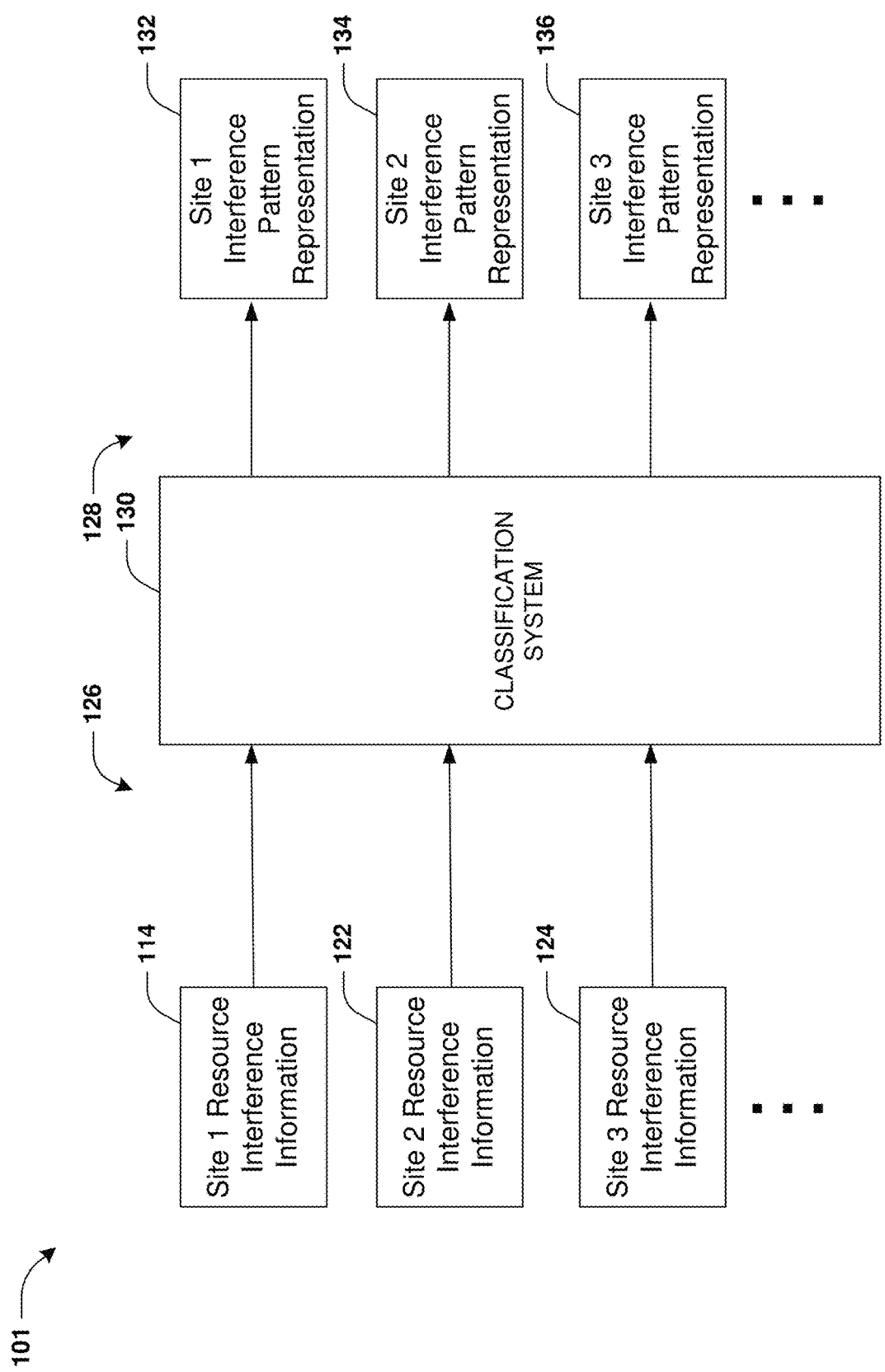
FIG. 1C is a diagram illustrating an example system for identifying interference patterns associated with wireless communication sites and/or grouping wireless communication sites based upon identified interference patterns, where a plurality of interference pattern representations associated with a plurality of wireless communication sites are generated according to some embodiments.
Figure 1E:
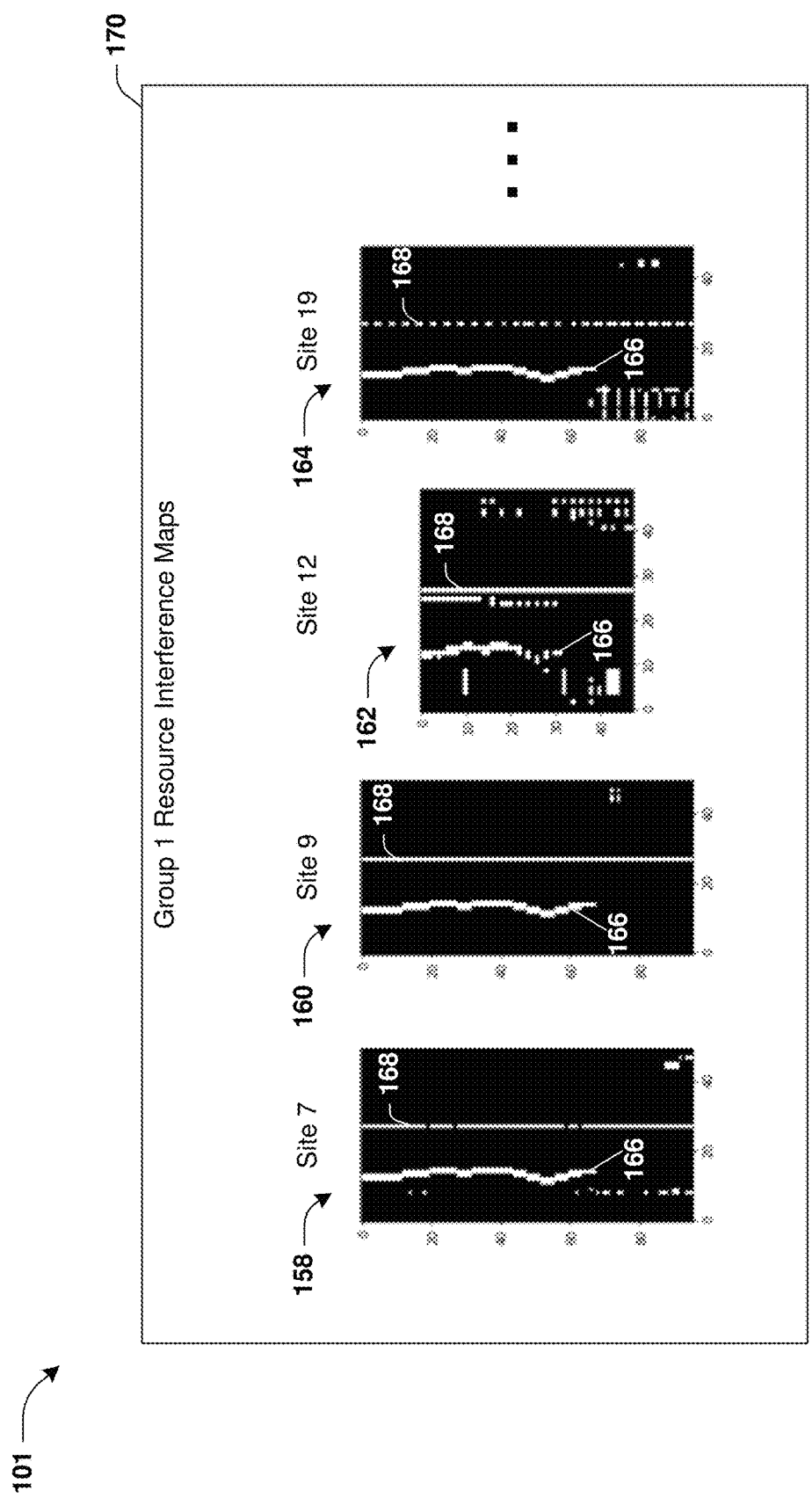
FIG. 1E is a diagram illustrating resource interference maps associated with wireless communication sites, according to some embodiments.
Figure 1F:
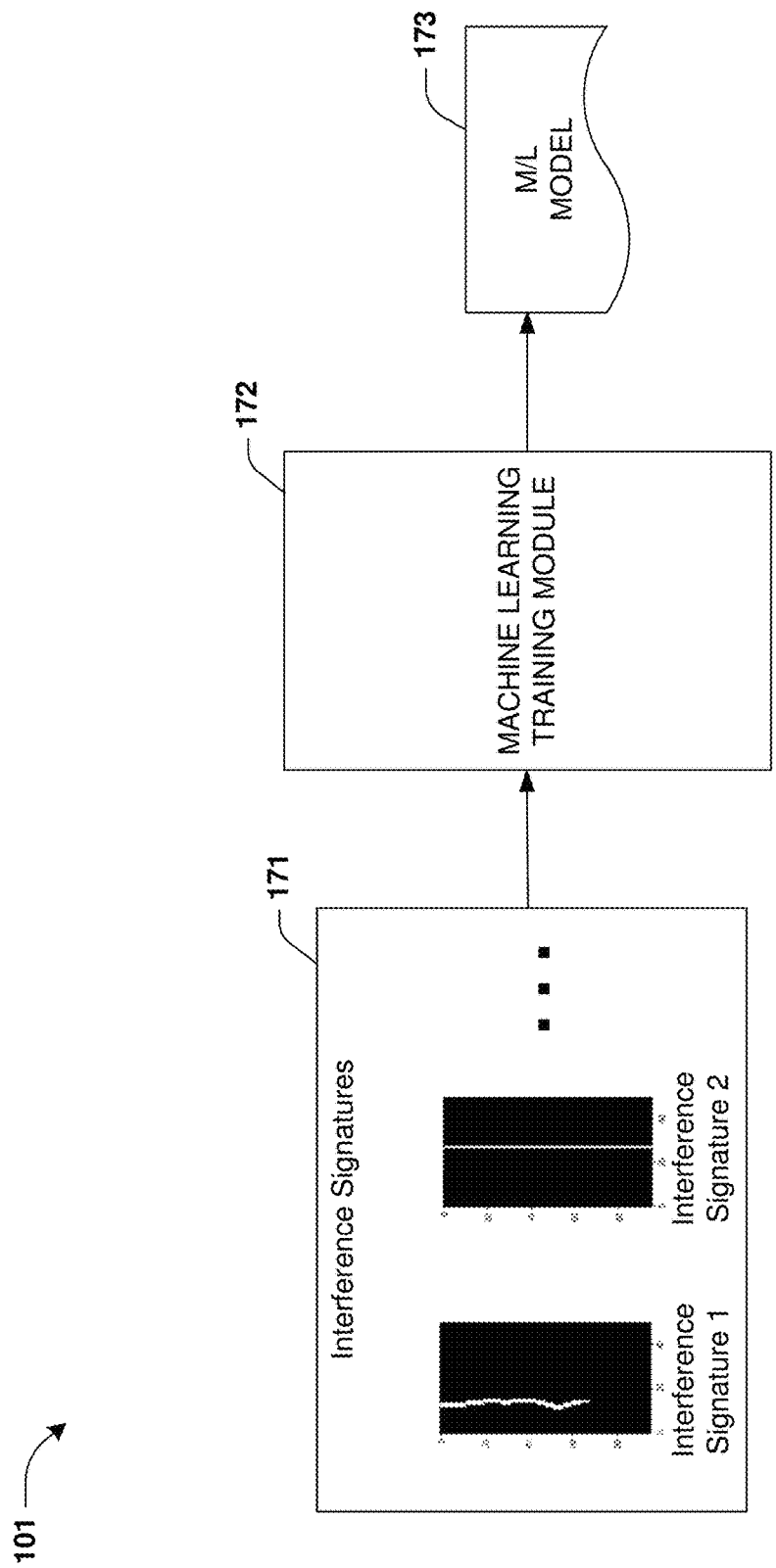
FIG. 1F is a diagram illustrating an example system for identifying interference patterns associated with wireless communication sites and/or grouping wireless communication sites based upon identified interference patterns, where a machine learning model is trained using interference signatures according to some embodiments.
Figure 1G:
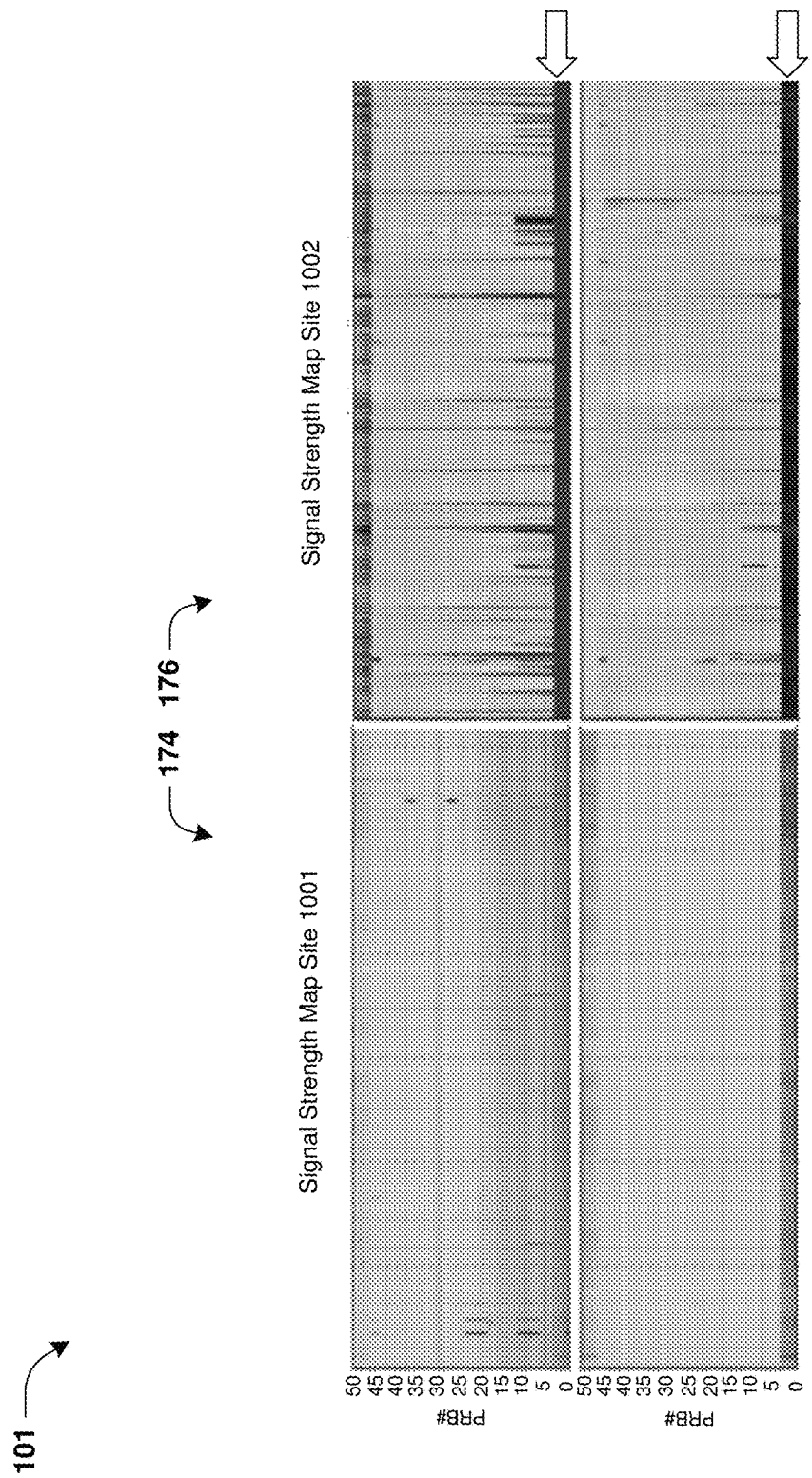
FIG. 1G is a diagram illustrating signal strength maps associated with wireless communication sites, according to some embodiments.
Figure 1H:
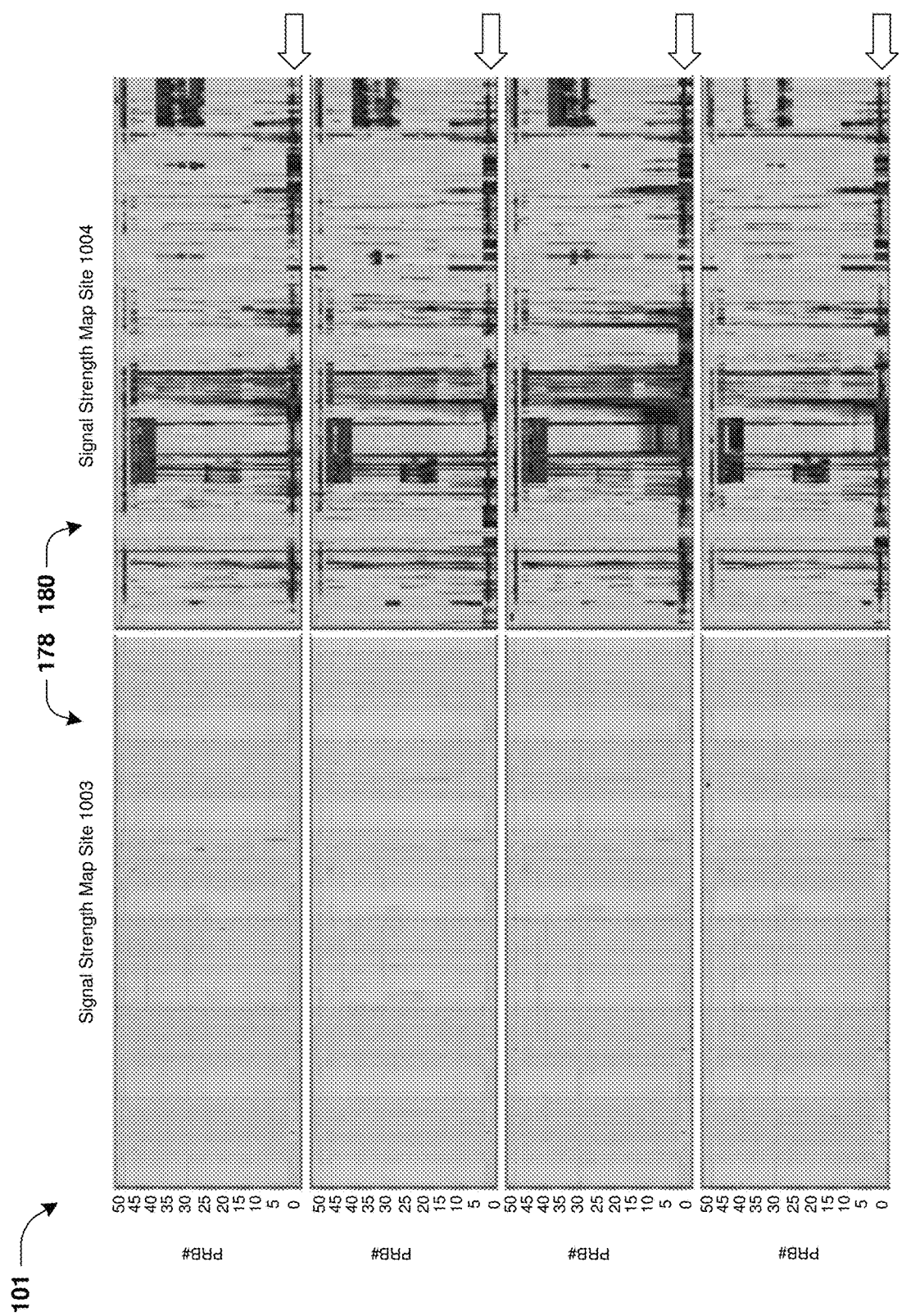
FIG. 1H is a diagram illustrating signal strength maps associated with wireless communication sites, according to some embodiments.
Figure 1I:
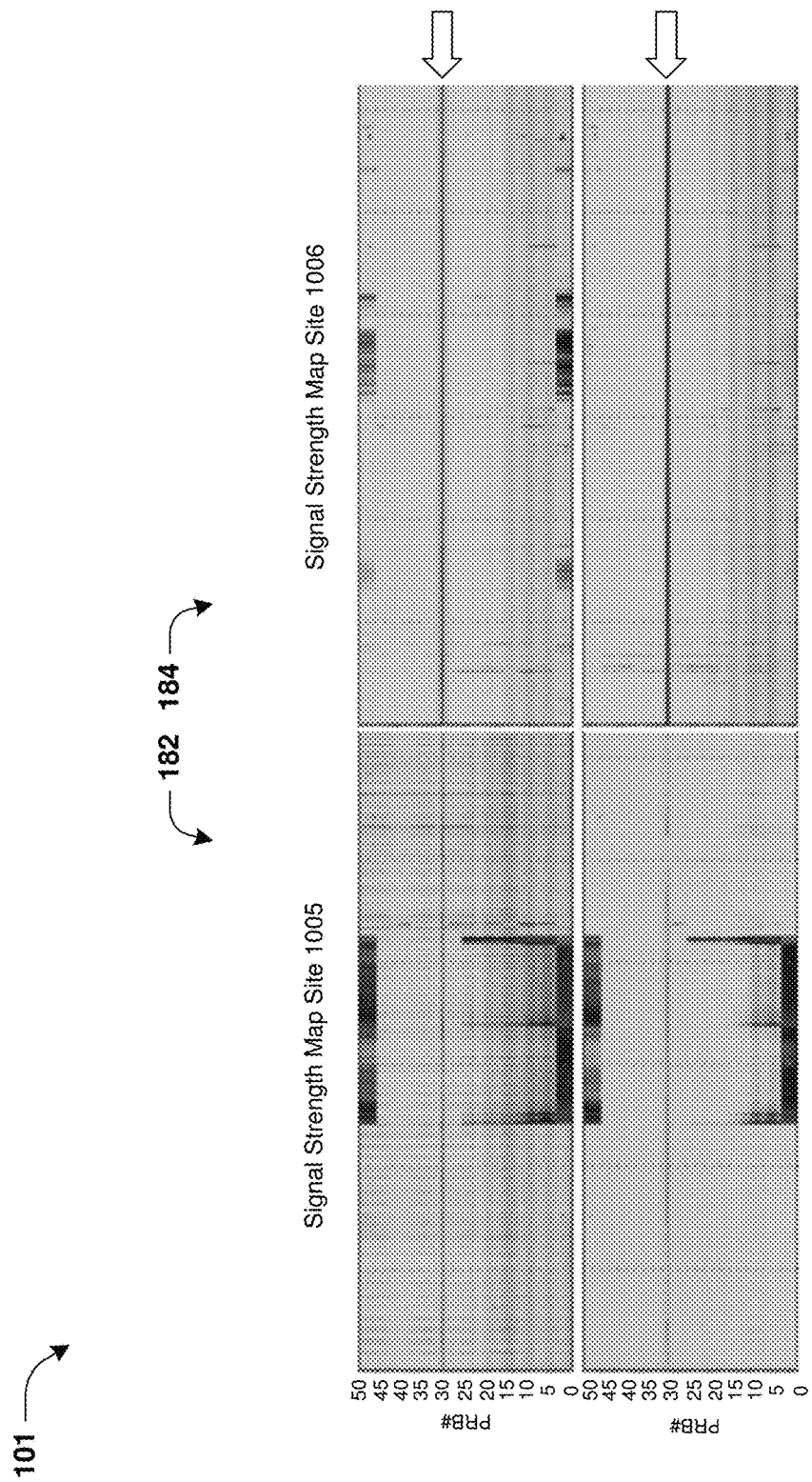
FIG. 1I is a diagram illustrating signal strength maps associated with wireless communication sites, according to some embodiments.
Figure 1J:
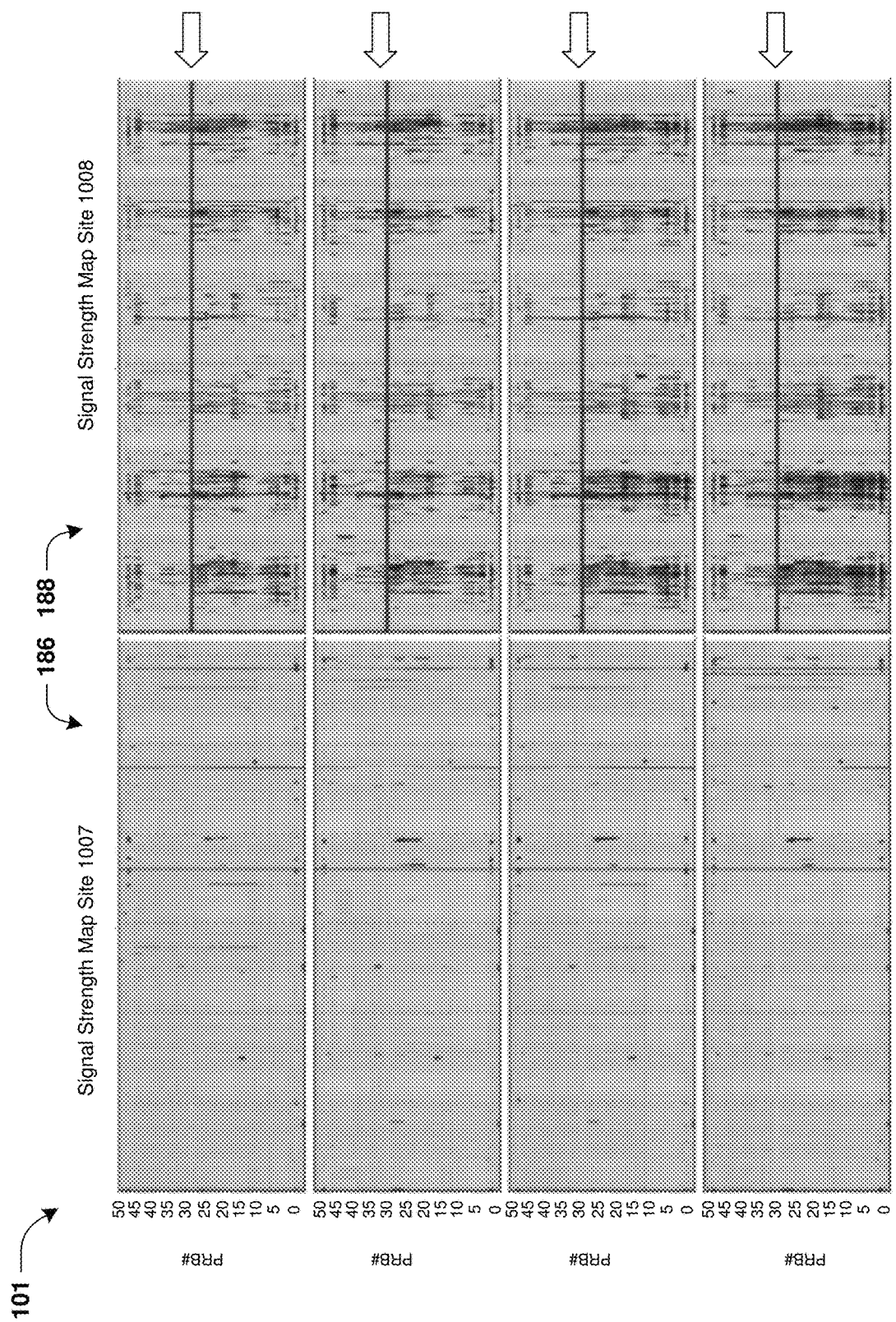
FIG. 1J is a diagram illustrating signal strength maps associated with wireless communication sites, according to some embodiments.
Figure 1K:
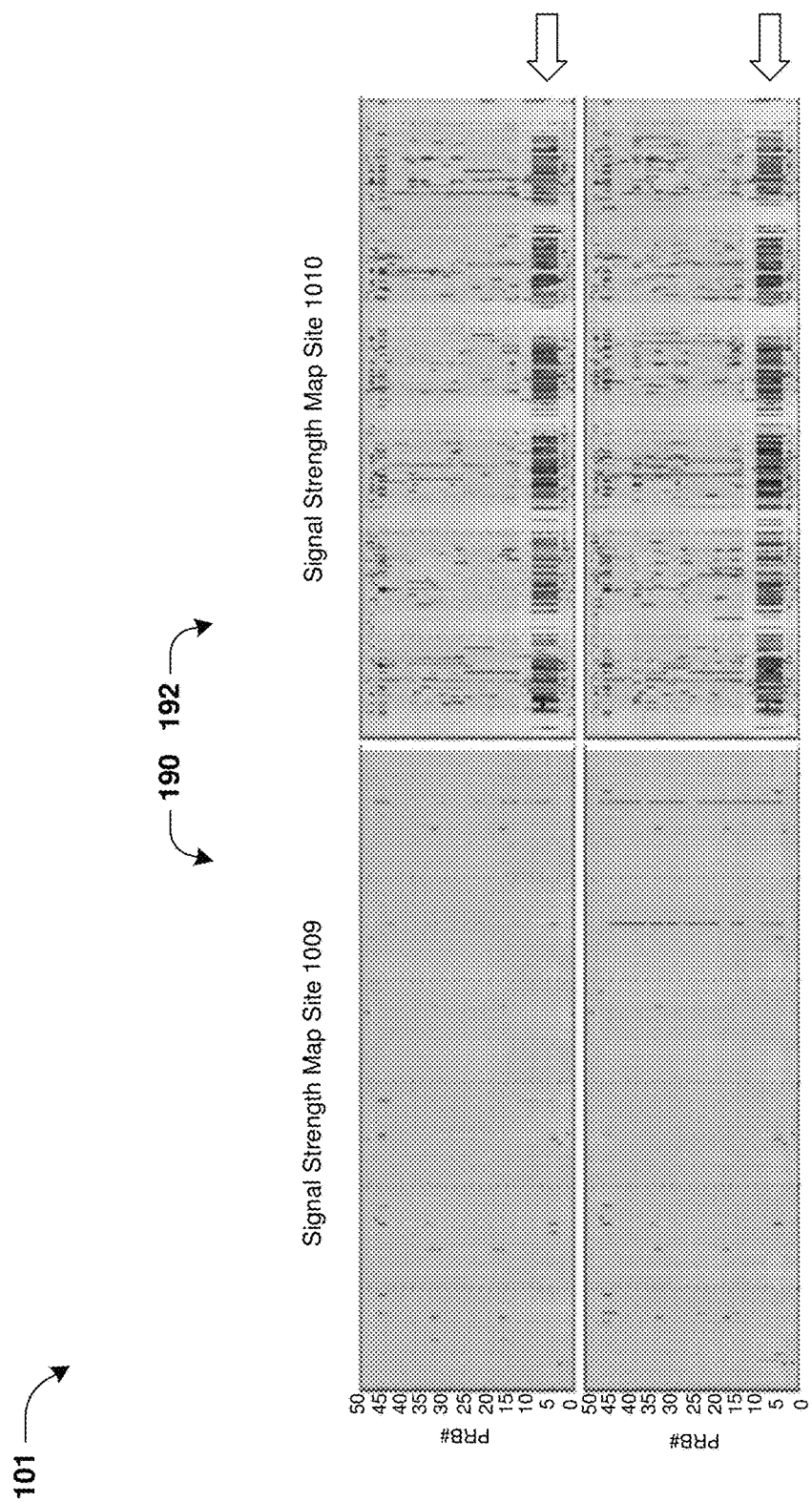
FIG. 1K is a diagram illustrating signal strength maps associated with wireless communication sites, according to some embodiments.
Figure 1L:
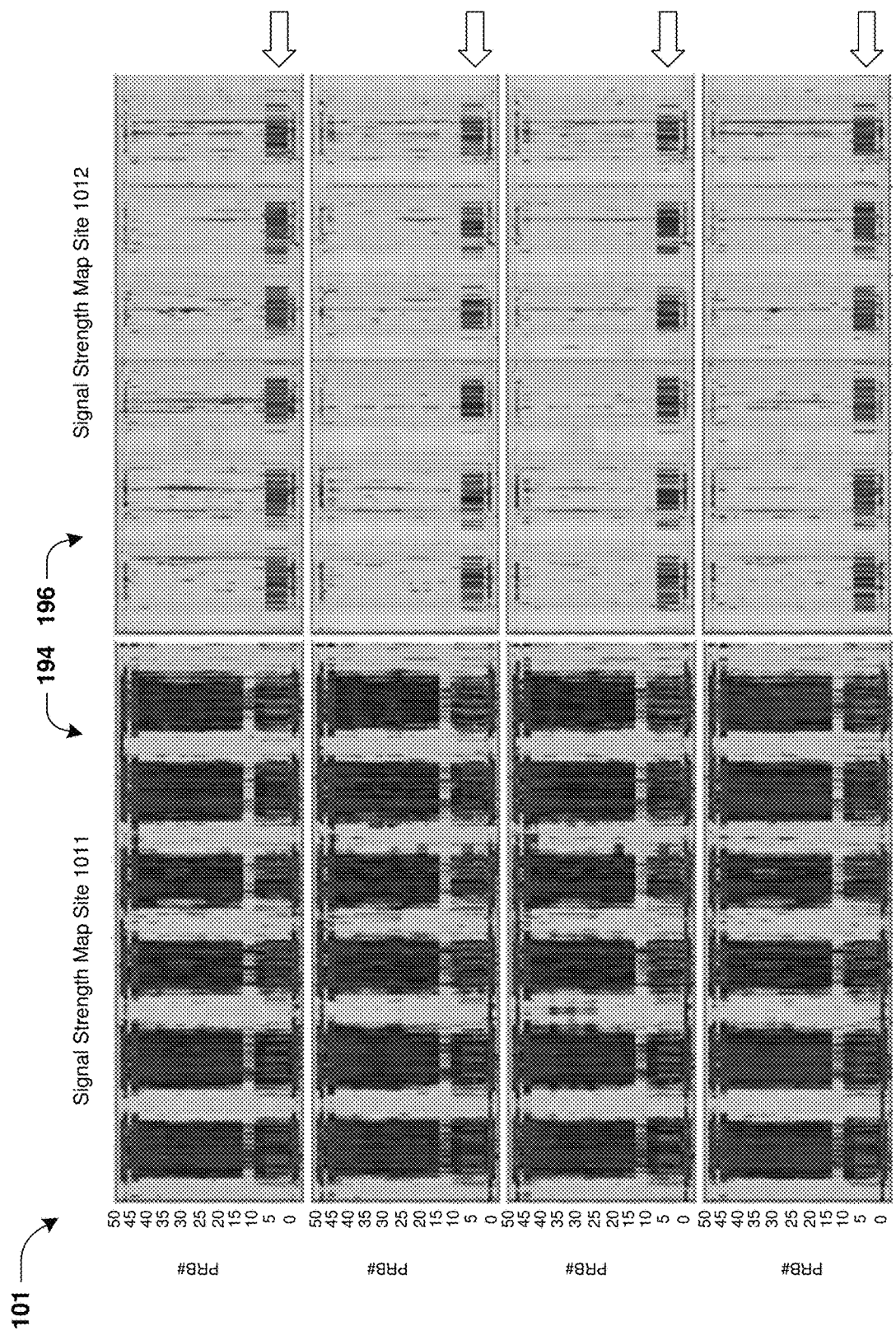
FIG. 1L is a diagram illustrating signal strength maps associated with wireless communication sites, according to some embodiments.
Figure 2:
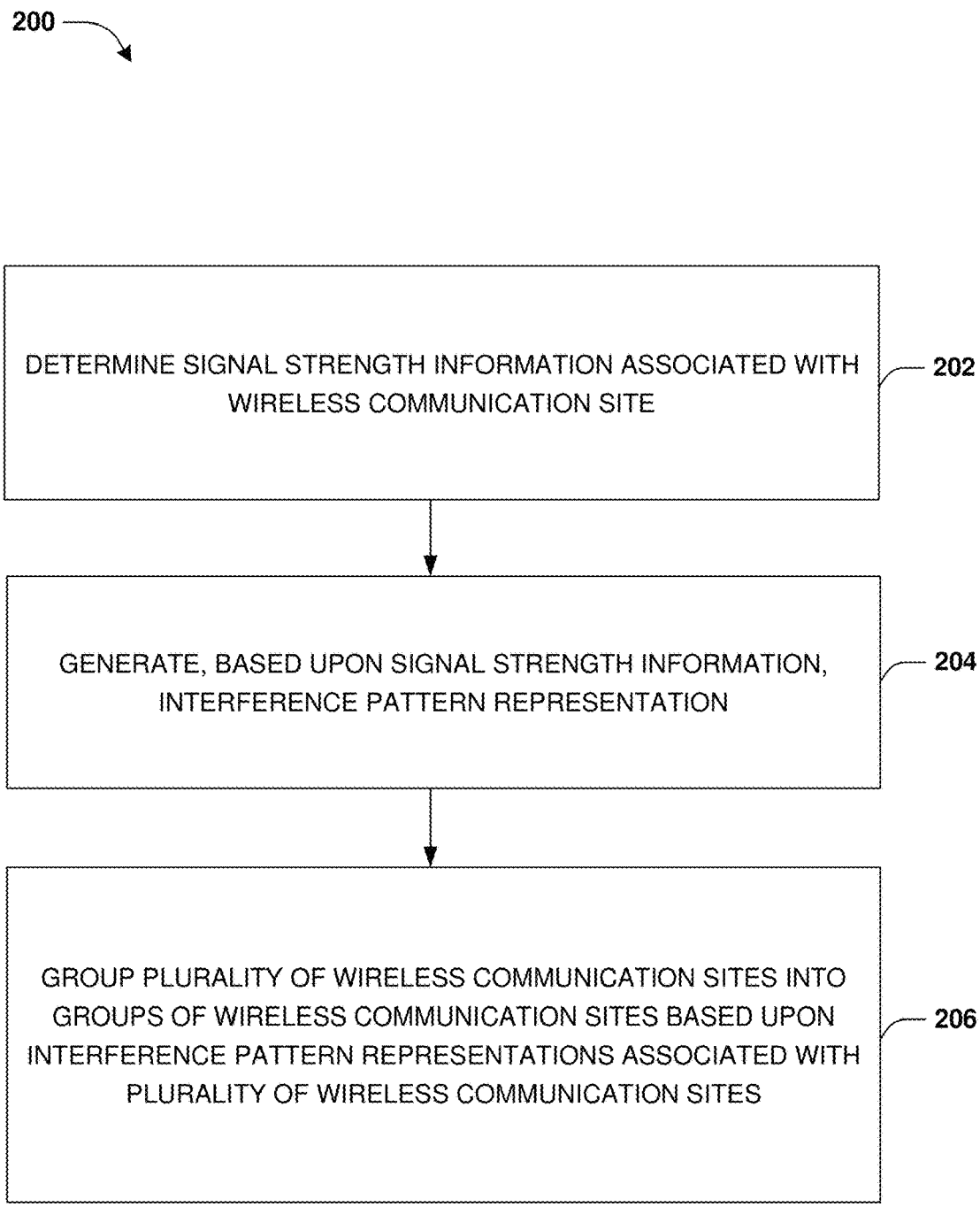
FIG. 2 is a flow chart illustrating an example method for identifying interference patterns associated with wireless communication sites and/or grouping wireless communication sites based upon identified interference patterns according to some embodiments.

An embodiment of identifying interference patterns associated with wireless communication sites and/or the grouping of wireless communication sites based upon identified interference patterns is illustrated by an exemplary method 200 of FIG. 2, and is further described in conjunction with the system 101 of FIGS. 1A-1L. At 202, first signal strength information associated with the first wireless communication site 106 may be determined. The first signal strength information may be indicative of a plurality of signal strengths associated with a plurality of resources (e.g., radio frequency (RF) resources) over a first period of time. In an example, a signal strength of the plurality of signal strengths (and/or each signal strength of the plurality of signal strengths) may be associated with a resource of the plurality of resources (e.g., the signal strength may correspond to a signal strength of a signal received via the resource). In some examples, signal strengths of the plurality of signal strengths (e.g., all signal strengths of the plurality of signal strengths) are uplink signal strengths and/or resources of the plurality of resources (e.g., all resources of the plurality of resources) are uplink resources. For example, a signal strength of the plurality of signal strengths (and/or each signal strength of the plurality of signal strengths) may be indicative of a received signal strength (e.g., an uplink signal strength) of a signal received by the first wireless communication site 106 via a resource of the plurality of resources (e.g., the signal strength may be a received signal strength indicator (RSSI) determined by the first wireless communication site 106), where the received signal strength may be determined by measuring reception power (in decibels or watts for example) of receptions performed via a reception port of the first wireless communication site 106. Accordingly, the first wireless communication site 106 may measure signal strengths (e.g., the plurality of signal strengths) associated with resources (e.g., the plurality of resources) over the first period of time, wherein the first signal strength information is based upon the signal strengths and the resources. Alternatively and/or additionally, embodiments are contemplated in which at least some signal strengths of the plurality of signal strengths are downlink signal strengths and/or at least some resource of the plurality of resources are downlink resources.

In some examples, a resource of the plurality of resources (and/or each resource of the plurality of resources) may be a time-frequency resource, such as a physical resource block (PRB), a set of PRBs, a resource element, a set of resource elements or other resource. In some examples, resources of the plurality of resources (e.g., all resources of the plurality of resources) may be within the first period of time associated with the first signal strength information (e.g., the first period of time may correspond to one or more minutes, one or more hours or other period of time).

At 204, a first interference pattern representation of one or more first interference patterns associated with the first wireless communication site 106 may be generated based upon the first signal strength information. For example, the one or more interference first patterns may be identified (and/or the first interference pattern representation may be generated) based upon the plurality of signal strengths associated with the plurality of resources.

In an example, first resource interference information associated with the first wireless communication site 106 may be determined based upon the first signal strength information, where the first interference pattern representation is generated based upon the first resource interference information. FIG. 1B illustrates the first resource interference information (shown with reference number 114) being determined based upon the first signal strength information 110. In an example shown in FIG. 1B, the first signal strength information 110 may comprise a signal strength map (e.g., a heat map) indicative of the plurality of signal strengths associated with the plurality of resources. The signal strength map may be a grid of signal strengths (e.g., the plurality of signal strengths) of resources (e.g., the plurality of resources) spanning a band of frequencies (e.g., a continuous band of frequencies) over the first period of time. The vertical axis of the signal strength map may correspond to frequency and/or the horizontal axis of the signal strength map may correspond to time. In an example, signal strengths (e.g., in units of decibels) of the signal strength map may be represented by red green blue (RGB) values (e.g., RGB colors) or other types of values. In some examples, each pixel of the signal strength map may be representative of a signal strength, of the plurality of signal strengths, associated with a resource of the plurality of resources.

In some examples, the first resource interference information 114 may be indicative of a first subset of resources, of the plurality of resources, associated with interference. For example, it may be determined (using the interference identification module 112, for example) that each resource of the first subset of resources is associated with interference. In an example, the interference identification module 112 may determine whether a resource of the plurality of resources is associated with interference based upon a signal strength, of the plurality of signal strengths, associated with the resource. For example, the signal strength may be compared with a threshold signal strength to determine whether the resource is associated with interference. In some examples, the interference identification module 112 may classify the resource as having interference based upon the signal strength not meeting the threshold signal strength (e.g., the signal strength being less than the threshold signal strength). Alternatively and/or additionally, the interference identification module 112 may classify the resource as not having interference based upon the signal strength meeting (e.g., exceeding) the threshold signal strength.

In some examples, the threshold signal strength may be determined based upon the plurality of signal strengths. In an example, signal strengths of the plurality of signal strengths may be combined (e.g., averaged) to determine the threshold signal strength. For example, the threshold signal strength may be equal to and/or may be based upon an average signal strength of the plurality of signal strengths. In some examples, the threshold signal strength may be compared with each signal strength of the plurality of signal strengths for determining whether resources of the plurality of resources are associated with interference.

Alternatively and/or additionally, multiple threshold signal strengths may be used for determining whether resources of the plurality of resources are associated with interference. For example, one or more first signal strengths of one or more first resources of the plurality of resources may be compared with a first threshold of the multiple thresholds to determine whether each resource of the one or more first resources is associated with interference, one or more second signal strengths of one or more second resources of the plurality of resources may be compared with a second threshold of the multiple thresholds to determine whether each resource of the one or more second resources is associated with interference, etc. In an example, the first threshold may be equal to and/or may be based upon an average signal strength of the one or more first signal strengths (e.g., a first local signal strength average of the one or more first resources), the second threshold may be equal to and/or may be based upon an average signal strength of the one or more second signal strengths (e.g., a second local signal strength average of the one or more second resources), etc.

Accordingly, each resource of the plurality of resources may be classified as having interference or classified as not having interference to determine the first resource interference information 114. In some examples, the first resource interference information 114 may comprise interference classification data (e.g., binary classification data) comprising a plurality of interference classifications associated with the plurality of resources. For example, an interference classification of the plurality of interference classifications (and/or each interference classification of the plurality of interference classifications) may be associated with a resource of the plurality of resources (e.g., the interference classification may be indicative of whether the resource is associated with interference). The plurality of interference classifications may be binary. For example, an interference classification (of the plurality of interference classifications) being equal to a first classification value (e.g., 1) may indicate that a resource associated with the interference classification is classified as having interference. Alternatively and/or additionally, an interference classification (of the plurality of interference classifications) being equal to a second classification value (e.g., 0) may indicate that a resource associated with the interference classification is classified as not having interference. Accordingly, interference classifications, of the plurality of interference classifications, associated with the first subset of resources may be equal to the first classification value. Alternatively and/or additionally, interference classifications, of the plurality of interference classifications, associated with resources of the plurality of resources that are not associated with interference may be equal to the second classification value. In an example shown in FIG. 1B, the first resource interference information 114 may comprise a resource interference map indicative of the plurality of interference classifications associated with the plurality of resources. The resource interference map may be a grid of interference classifications (e.g., the plurality of interference classifications) of resources (e.g., the plurality of resources) spanning the band of frequencies (e.g., a continuous band of frequencies) over the first period of time. The vertical axis of the resource interference map may correspond to frequency and/or the horizontal axis of the resource interference map may correspond to time. In an example, interference classifications of the resource interference map may be shown in white (e.g., the first classification value indicative of a resource having interference) and black (e.g., the second classification value indicative of a resource not having interference). In some examples, each pixel of the resource interference map may be representative of an interference classification, of the plurality of interference classifications, associated with a resource of the plurality of resources (e.g., the pixel being white may indicate that the resource is classified as having interference and/or the pixel being black may indicate that the resource is classified as not having interference).

In some examples, the first interference pattern representation may comprise a first vector representation of the one or more first interference patterns associated with the first wireless communication site 106. For example, the first vector representation may be generated based upon the first resource interference information 114. Alternatively and/or additionally, the first vector representation may be a representation of the first resource interference information 114. For example, the first vector representation may be generated using a first machine learning model, such as an unsupervised machine learning model (e.g., a machine learning model that does not require labeled data to generate the first vector representation). In some examples, image classification may be performed, using the first machine learning model, on the first resource interference information 114 to generate the first vector representation. For example, the image classification may be performed to classify the first resource interference information 114 as the first vector representation (e.g., the one or more first interference patterns associated with the first wireless communication site 106 may be classified as the first vector representation). For example, the first vector representation may correspond to a classification of the first resource interference information 114 and/or the one or more first interference patterns.

FIG. 1C illustrates a plurality of interference pattern representations 128 associated with a plurality of wireless communication sites being generated. The plurality of wireless communication sites may comprise the first wireless communication site 106. The plurality of interference pattern representations 128 may comprise the first interference pattern representation (shown with reference number 132) associated with the first wireless communication site 106. In some examples, other interference pattern representations, of the plurality of interference pattern representations 128, other than the first interference pattern representation 132 may be generated using one or more of the techniques provided herein with respect to generating the first interference pattern representation 132. In an example, the plurality of interference pattern representations 128 associated with the plurality of wireless communication sites may be generated using a classification system 130 (e.g., an image classification system). In an example, the classification system 130 may use the first machine learning model to generate the plurality of interference pattern representations 128 (e.g., the first machine learning model may be loaded on the classification system 130). The classification system 130 may generate the plurality of interference pattern representations 128 based upon a plurality of sets of resource interference information 126. The plurality of sets of resource interference information 126 may comprise the first resource interference information 114 associated with the first wireless communication site 106 and/or other sets of resource interference information associated with other wireless communication sites of the plurality of wireless communication sites. In an example, for each wireless communication site of the plurality of wireless communication sites, the classification system 130 may generate an interference pattern representation (of the plurality of interference pattern representations 128) based upon a set of resource interference information, of the plurality of sets of resource interference information 126, associated with the wireless communication site (e.g., the interference pattern representation may comprise a vector representation indicative of a classification of the set of resource interference information). For example, the classification system 130 may generate at least one of: (i) the first interference pattern representation 132 based upon the first resource interference information 114, (ii) a second interference pattern representation 134 associated with a second wireless communication site based upon a second set of resource interference information 122 associated with the second wireless communication site, (iii) a third interference pattern representation 136 associated with a third wireless communication site based upon a third set of resource interference information 124 associated with the third wireless communication site, etc.

Alternatively and/or additionally, in some examples, the plurality of interference pattern representations 128 may be generated based upon a plurality of sets of signal strength information associated with the plurality of wireless communication sites (e.g., the plurality of interference pattern representations 128 may be generated based upon the plurality of sets of signal strength information in addition to or in place of generating the plurality of interference pattern representations 128 based upon the plurality of sets of resource interference information 126). For example, the plurality of sets of signal strength information may comprise second signal strength information associated with the first wireless communication site 106. The second signal strength information may be determined based upon the first signal strength information 110. For example, values indicated by the first signal strength information 110 may be modified to generate the second signal strength information. In an example in which the first signal strength information 110 comprises the signal strength map with RGB values (e.g., RGB colors), the signal strength map may be converted to a second signal strength map, such as a signal strength map in grayscale. The first interference pattern representation 132 (e.g., the first vector representation) may be generated, using the first machine learning model (and/or the classification system 130), based upon the second signal strength information. In an example, other interference pattern representations, of the plurality of interference pattern representations 128, other than the first interference pattern representation 132 may be generated using one or more of the techniques provided herein with respect to generating the first interference pattern representation 132.

At 206, the plurality of wireless communication sites are grouped (e.g., clustered and/or segmented) into a plurality of groups of wireless communication sites based upon the plurality of interference pattern representations 128 associated with the plurality of wireless communication sites. For example, first wireless communication sites of the plurality of wireless communication sites may be grouped into a first group of wireless communication sites, of the plurality of groups of wireless communication sites, based upon a determination that first interference pattern representations (of the plurality of interference pattern representations 128) associated with the first wireless communication sites are related. For example, the first interference pattern representations may be related if the first interference pattern representations have common characteristics, if similarities between the first interference pattern representations exceed a threshold similarity and/or if differences between the first interference pattern representations are less than a threshold difference.

FIG. 1D illustrates the plurality of wireless communication sites being grouped into the plurality of groups of wireless communication sites (shown with reference number 146). In an example, the plurality of wireless communication sites may be grouped into the plurality of groups of wireless communication sites 146, based upon the plurality of interference pattern representations 128, using a clustering module 144. In some examples, the plurality of wireless communication sites may be grouped such that wireless communication sites associated with related interference pattern representations are included in the same group of the plurality of groups of wireless communication sites 146 (e.g., the related interference pattern representations may have common characteristics, similarities between the related interference pattern representations may exceed a threshold similarity and/or differences between the related interference pattern representations may be less than a threshold difference). The plurality of groups of wireless communication sites 146 may comprise the first group of wireless communication sites (shown with reference number 148), a second group of wireless communication sites 150, a third group of wireless communication sites 152 and/or one or more other groups of wireless communication sites (not shown).

In an example, the plurality of interference pattern representations 128 may be grouped (using the clustering module 144, for example) into a plurality of groups of interference pattern representations. The plurality of groups of wireless communication sites 146 may be based upon the plurality of groups of interference pattern representations (e.g., the first group of wireless communication sites 148 may comprise wireless communication sites associated with a first group of interference pattern representations of the plurality of groups of interference pattern representations, the second group of wireless communication sites 150 may comprise wireless communication sites associated with a second group of interference pattern representations of the plurality of groups of interference pattern representations, etc.). In some examples, the plurality of interference pattern representations 128 may be grouped such that related interference pattern representations are included in the same group of the plurality of groups of interference pattern representations.

In some examples, the plurality of wireless communication sites may be grouped into the plurality of groups of wireless communication sites 146 by performing density-based clustering based upon the plurality of interference pattern representations 128. For example, the clustering module 144 may perform density-based clustering (and/or one or more other types of clustering) to group the plurality of wireless communication sites into the plurality of groups of wireless communication sites 146. The density-based clustering may comprise Density-based Clustering of Applications with Noise (DBSCAN) and/or Hierarchical DBSCAN (HDBSCAN). For example, the density-based clustering may be performed using a density-based clustering algorithm (e.g., an unsupervised clustering algorithm), such as a DBSCAN clustering algorithm and/or an HDBSCAN clustering algorithm. In some examples, the density-based clustering may be performed using a second machine learning clustering and/or classification model (e.g., an unsupervised machine learning clustering and/or classification model), such as a model comprising the density-based clustering algorithm.

It may be appreciated that using an unsupervised machine learning model (e.g., the first machine learning model and/or the second machine learning clustering and/or classification model) for generating the plurality of interference pattern representations 128 and/or for grouping the plurality of wireless communication sites into the plurality of groups of wireless communication sites 146 may lead to benefits including less effort associated with generating labeled data for use in training machine learning models.

FIG. 1E illustrates resource interference maps 170 associated with wireless communication sites of the first group of wireless communication sites 148. The first group of wireless communication sites 148 may comprise Site 7, Site 9, Site 12, Site 19 and/or one or more other wireless communication sites of the plurality of wireless communication sites. The resource interference maps 170 may comprise a resource interference map 158 associated with Site 7, a resource interference map 160 associated with Site 9, a resource interference map 162 associated with Site 12 and/or a resource interference map 164 associated with Site 19. As shown by the resource interference maps 170, wireless communication sites of the first group of wireless communication sites 148 may be associated with first related interference patterns 166 and/or second related interference patterns 168. For example, a wireless communication site (e.g., Site 7, Site 9, Site 12 and/or Site 19) may be grouped into the first group of wireless communication sites 148 based upon the wireless communication site being associated with a related interference pattern of the first related interference patterns 166 and/or a related interference pattern of the second related interference patterns 168. Alternatively and/or additionally, a wireless communication site (e.g., Site 7, Site 9, Site 12 and/or Site 19) may be grouped into the first group of wireless communication sites 148 based upon an interference pattern representation (e.g., an interference pattern representation of the plurality of interference pattern representations 128) associated with the wireless communication site being representative of a related interference pattern of the first related interference patterns 166 and/or a related interference pattern of the second related interference patterns 168. Alternatively and/or additionally, the first group of wireless communication sites 148 may be grouped together based upon interference pattern representations (e.g., interference pattern representations of the plurality of interference pattern representations 128) associated with the first group of wireless communication sites 148 being representative of the first related interference patterns 166 and/or the second related interference patterns 168.

In some examples, interference patterns may be related to each other (e.g., the first related interference patterns 166 may be related to each other and/or the second related interference patterns 168 may be related to each other) based upon at least one of: (i) shapes of the interference patterns being similar to each other (e.g., a similarity between a shape of a first interference pattern of the interference patterns and a shape of a second interference pattern of the interference patterns exceeds a threshold similarity and/or a difference between the shape of the first interference pattern and the shape of the second interference pattern is less than a threshold difference), (ii) frequencies of resources of the interference patterns being similar to each other (e.g., one or more differences between frequencies of resources of a first interference pattern of the interference patterns and frequencies of resources of a second interference pattern of the interference patterns are less than a threshold difference), (iii) times of resources of the interference patterns being similar to each other (e.g., one or more differences between times of resources of a first interference pattern of the interference patterns and times of resources of a second interference pattern of the interference patterns are less than a threshold difference), etc. In some examples, a shape of an interference pattern may correspond to a shape of resources, of the interference pattern, that are classified as having interference (e.g., the resources that are classified as having interference are shown in white in the resource interference maps 170). Alternatively and/or additionally, frequencies of resources of an interference pattern may correspond to frequencies of resources, of the interference pattern, that are classified as having interference. Alternatively and/or additionally, times of resources of an interference pattern may correspond to times of resources, of the interference pattern, that are classified as having interference.

Alternatively and/or additionally, a plurality of interference signatures may be generated based upon the plurality of interference pattern representations 128 and/or the plurality of sets of resource interference information 126. For example, the plurality of interference signatures may be clean interference patterns that are extracted from interference pattern representations of the plurality of interference pattern representations 128. In an example, interference signatures (of the plurality of interference signatures) are used (in association with a supervised machine learning model, for example) to capture a group of sites for each interference signature.

In an example, the plurality of interference signatures may be used to train a machine learning model to generate a third machine learning model for use in grouping the plurality of wireless communication sites into a second plurality of groups of wireless communication sites (e.g., the third machine learning model may be trained, using the plurality of interference signatures, to classify wireless communication sites and/or sort the wireless communication sites into groups). FIG. 1F illustrates a training module 172 training a machine learning model to generate the third machine learning model (shown with reference number 173). In an example, the third machine learning model 173 may be trained by the training module 172 using the plurality of interference signatures (shown with reference number 171). In an example, interference signatures of the plurality of interference signatures 171 are used as labeled data to perform machine learning model training to generate the third machine learning model 173. In some examples, an interference signature of the plurality of interference signatures 171 (and/or each interference signature of the plurality of interference signatures 171) may correspond to (and/or may be generated based upon) a set of related interference patterns of the plurality of interference pattern representations 128 and/or the plurality of sets of resource interference information 126. For example, a first interference signature "Interference Signature 1" of the plurality of interference signatures 171 may correspond to (and/or may be generated based upon) the first related interference patterns 166 and/or a second interference signature "Interference Signature 2" may correspond to (and/or may be generated based upon) the second related interference patterns 168. In some examples, Interference Signature 1 may be a representation of the first related interference patterns 166, Interference Signature 2 may be a representation of the second related interference patterns 168, etc. In an example, one or more related interference patterns of a set of related interference patterns may be refined, conditioned and/or averaged (using one or more image conditioning techniques, for example) to generate an interference signature of the plurality of interference signatures 171. For example, one or more related interference patterns of the first related interference patterns 166 may be refined, conditioned and/or averaged to generate Interference Signature 1.

In some examples, the plurality of wireless communication sites may be grouped into the second plurality of groups of wireless communication sites using the third machine learning model. For example, the third machine learning model may be trained and/or configured to classify a wireless communication site of the plurality of wireless communication sites as having an interference signature of the plurality of interference signatures 171 (e.g., the wireless communication site may be classified as having the interference signature based upon an interference pattern representation, of the plurality of interference pattern representations 128, associated with the wireless communication site). In an example, the third machine learning model may be used to group the plurality of wireless communication sites into the second plurality of groups of wireless communication sites based upon the plurality of interference pattern representations 128 associated with the plurality of wireless communication sites. In some examples, wireless communication sites may be grouped into a group of wireless communication sites of the second plurality of groups of wireless communication sites based upon a determination that the wireless communication sites are classified as having an interference signature of the plurality of interference signatures 171. For example, a group of wireless communication sites of the second plurality of groups of wireless communication sites (and/or each group of wireless communication sites of the second plurality of groups of wireless communication sites) may be associated with an interference signature of the plurality of interference signatures 171 (and/or wireless communication sites that are classified as having the interference signature may be included in the group of wireless communication sites). For example, a group of wireless communication sites of the second plurality of groups of wireless communication sites (and/or each group of wireless communication sites of the second plurality of groups of wireless communication sites) may comprise wireless communication sites that are associated with related interference patterns corresponding to an interference signature of the plurality of interference signatures 171. In an example, each wireless communication site of the group of wireless communication sites may be included in the group of wireless communication site based upon the wireless communication site being classified as having the interference signature associated with the group of wireless communication sites.

In some examples, the plurality of groups of wireless communication sites 146 and/or the second plurality of groups of wireless communication sites may be used to identify interference sources and/or types of interference sources associated with wireless communication sites. For example, wireless communication sites (of a group) having related interference patterns may indicate that at least some of the wireless communication sites are affected by the same interference source and/or the same type of interference source.

In an example, the first related interference patterns 166 may be associated with a first interference source and/or a first type of interference source. The second related interference patterns 168 may be associated with a second interference source and/or a second type of interference source. For example, the first interference source may be a source of interference that causes wireless communication sites of a fourth group of wireless communication sites to have the first related interference patterns 166, where the interference may comprise at least one of one or more signals, electromagnetic radiation, etc. (emitted and/or transmitted by the first interference source, for example) that interfere with signals received by the wireless communication sites of the fourth group of wireless communication sites. In an example, the fourth group of wireless communication sites may be the first group of wireless communication sites 148 associated with the first related interference patterns 166 and/or the second related interference patterns 168. Alternatively and/or additionally, the fourth group of wireless communication sites may be a group of wireless communication sites, of the second plurality of groups of wireless communication sites, associated with the first interference signature "Interference Signature 1" (e.g., each wireless communication site of the group of wireless communication sites may be classified as having the first interference signature "Interference Signature 1"). In some examples, the fourth group of wireless communication sites being grouped together (and/or wireless communication sites of the fourth group of wireless communication sites having the first related interference patterns 166) may indicate that the same interference source and/or the same type of interference source (e.g., the first interference source and/or the second interference source) interferes with wireless communication of the fourth group of wireless communication sites. For example, based upon a determination that wireless communication sites of the fourth group of wireless communication sites are grouped together (and/or based upon a determination that the wireless communication sites are associated with related interference patterns), it may be determined that wireless communication of the wireless communication sites is being interfered with by the same interference source and/or the same type of interference source. For example, based upon a determination that wireless communication sites of the fourth group of wireless communication sites are associated with the first related interference patterns 166, it may be determined that wireless communication of the wireless communication sites is affected by the first interference source and/or the first type of interference source associated with the first related interference patterns 166, wherein interference emitted by the first interference source (and/or an interference source of the first type of interference source) interferes with wireless communication of the wireless communication sites in association with the first related interference patterns 166.

In some examples, first interference identification information associated with the first interference source and/or the first type of interference source may be determined based upon wireless communication sites, of the fourth group of wireless communication sites, determined to be associated with the first related interference patterns 166. For example, the first interference identification information may comprise one or more indications of the first type of interference source (e.g., a type of equipment that emits interference associated with the first related interference patterns 166). For example, the one or more indications of the first type of interference source may be indicative of one or more types of equipment that cause interference, associated with the first related interference patterns 166, to wireless communication systems. For example, the one or more types of equipment may be determined based upon historical interference detection information indicative of interference patterns and/or types of equipment determined to have caused the interference patterns. For example, a type of equipment may be included in the one or more types of equipment based upon an indication, in the historical interference detection information, that the type of equipment causes interference corresponding to the first related interference patterns 166. Alternatively and/or additionally, the first interference identification information may be indicative of prioritization of the one or more types of equipment. For example, the one or more types of equipment may be prioritized by likelihood. For example, a third type of equipment of the one or more types of equipment may be prioritized over a fourth type of equipment of the one or more types of equipment based upon a determination that a likelihood that the third type of equipment causes interference corresponding to the first related interference patterns 166 is greater than a likelihood that the fourth type of equipment causes interference corresponding to the first related interference patterns 166. The prioritization of the one or more types of equipment may be determined based upon the historical interference detection information (such as based upon a quantity of times that interference corresponding to the first related interference patterns 166 was caused by the third type of equipment and/or a quantity of times that interference corresponding to the first related interference patterns 166 was caused by the fourth type of equipment).

Alternatively and/or additionally, the first interference identification information may comprise a first interference location of the first interference source. For example, the first interference location may correspond to a region within which the first interference source is located. Alternatively and/or additionally, the first interference location may correspond to a point at which the first interference source is located. In some examples, locations of the wireless communication sites associated with the first related interference patterns 166 may be determined. The first interference location may be determined based upon locations of the wireless communication sites associated with the first related interference patterns 166. For example, triangulation may be performed based upon the locations of the wireless communication sites to determine the first interference location associated with the first interference source.

Alternatively and/or additionally, equipment location information may be analyzed to determine one or more second interference locations. For example, the equipment location information may be indicative of locations of devices. The equipment location information may be analyzed to identify one or more devices, corresponding to the one or more types of equipment associated with the first related interference patterns 166, that are within the first interference location and/or that are within a threshold distance from the first location. The one or more second interference locations may comprise locations of the one or more devices. Each device of the one or more devices may correspond to a type of equipment of the one or more types of equipment associated with the first related interference patterns 166.

In some examples, in response to determining the first interference identification information associated with the first interference source, interference mitigation information may be generated based upon the first interference identification information. The interference mitigation information may be transmitted to an interference mitigation system. For example, the interference mitigation information may be indicative of at least one of the first interference identification information, the first interference location associated with the first interference source, the one or more second interference locations associated with the one or more devices, the one or more types of equipment associated with the first related interference patterns 166, the one or more devices corresponding to the one or more types of equipment, a representation of an interference pattern of the first related interference patterns 166 associated with the first interference source, a representation of Interference Signature 1 associated with the first related interference patterns 166, one or more resource interference maps of the resource interference maps 170, instructions to allocate one or more interference mitigation resources to the first interference location and/or to the one or more second interference locations, the prioritization of the one or more types of equipment associated with the related interference patterns 166, etc. In some examples, the interference mitigation system may provide the interference mitigation information via an interface, such as an application programming interface (API) and/or a graphical user interface (GUI) to allow for information display. The interference mitigation information may be used to locate and/or mitigate the first interference source.

In some examples, the instructions indicated by the interference mitigation information may be indicative of dispatching one or more interference mitigation resources (e.g., interference tracking equipment) to the first interference location and/or the one or more second interference locations associated with the one or more devices (e.g., the first interference source may be tracked and/or identified, such as by the one or more technicians, using the equipment). For example, the one or more interference mitigation resources may be deployed (with the one or more technicians, for example) to the first interference location and/or the one or more second interference locations based upon the instructions indicated by the interference mitigation information. Alternatively and/or additionally, the instructions indicated by the interference mitigation information may be indicative of performing one or more corrective actions associated with equipment associated with the one or more types of equipment (e.g., the interference mitigation information may be indicative of checking, replacing and/or deactivating equipment associated with a type of equipment of the one or more types of equipment). For example, the instructions indicated by the interference mitigation information may be indicative of performing one or more corrective actions associated with the one or more devices (e.g., the interference mitigation information may be indicative of checking, replacing and/or deactivating a device of the one or more devices). Alternatively and/or additionally, the instructions indicated by the interference mitigation information may be indicative of an order in which to perform corrective actions associated with equipment associated with the one or more types of equipment, where the order may be based upon the prioritization of the one or more types of equipment (e.g., the order may correspond to initially checking and/or replacing a highest prioritized type of equipment of the one or more types of equipment, followed by checking and/or replacing a second-highest prioritized type of equipment of the one or more types of equipment, etc.). For example, one or more corrective actions may be performed based upon the instructions indicated by the interference mitigation information.

In some examples, one or more actions may be performed (e.g., automatically performed) to mitigate and/or prevent interference of the first interference source (e.g., mitigate and/or prevent at least one of one or more signals, electromagnetic radiation, etc. emitted by the first interference source that interfere with wireless communication by wireless communication sites and/or UEs). For example, settings and/or parameters of equipment determined to be the first interference source may be modified (e.g., automatically modified) to mitigate and/or prevent interference emitted by the equipment that interferes with wireless communication by wireless communication sites and/or UEs (e.g., one or more components of the equipment associated with causing interference may be deactivated). For example, settings and/or parameters of a device of the one or more devices may be modified (e.g., automatically modified) to mitigate and/or prevent interference emitted by the device that interferes with wireless communication by wireless communication sites and/or UEs.

Accordingly, implementation of one or more of the techniques provided herein may lead to benefits including, but not limited to, at least one of automatic identification of one or more types of equipment associated with an interference source, automatic identification of one or more devices associated with the interference source, automatic identification of one or more interference locations associated with the interference source, automatic deployment of interference mitigation resources to the one or more interference locations, automatic modification of parameters and/or settings of a device to mitigate and/or prevent interference of an interference source, etc. Alternatively and/or additionally, the automatic identification of the one or more types of equipment associated with the interference source, the automatic identification of the one or more devices associated with the interference source, the automatic identification of the one or more interference locations associated with the interference source, the automatic deployment of interference mitigation resources to the one or more interference locations, and/or the automatic modification of parameters and/or settings of the device may be performed with increased speed and/or may be performed with reduced effort (and/or no manual effort).

In some examples, after the first interference source is identified and/or interference of the first interference source is mitigated and/or prevented, first interference source information associated with the first interference source may be received via an interface. The first interference source information may be indicative of at least one of a type of interference source of the first interference source (e.g., identification of a device determined to be the first interference source), a location of the first interference source, etc. The first interference source information may be included in the historical interference detection information (e.g., the historical interference detection information may be updated based upon the first interference source information).

FIGS. 1G-1L illustrate signal strength maps associated with wireless communication sites of groups of wireless communication sites of the plurality of groups of wireless communication sites 146 and/or the second plurality of groups of wireless communication sites. In some examples, vertical axes of the signal strength maps may correspond to frequency. Horizontal axes of the signal strength maps may correspond to time.

FIGS. 1G-1H illustrate signal strength maps associated with wireless communication sites of a group of wireless communication sites (of the plurality of groups of wireless communication sites 146 and/or the second plurality of groups of wireless communication sites) associated with interference patterns corresponding to a first type of interference. For example, the group of wireless communication sites may comprise sites 1001, 1002, 1003 and 1004. The signal strength maps associated with the group of wireless communication sites comprise signal strength maps 174 (left-side column of FIG. 1G) associated with wireless communication site 1001, signal strength maps 176 (right-side column of FIG. 1G) associated with wireless communication site 1002, signal strength maps 178 (left-side column of FIG. 1H) associated with wireless communication site 1003 and signal strength maps 180 (right-side column of FIG. 1H) associated with wireless communication site 1004. Frequency locations (e.g., PRBs 1-4) of the interference patterns corresponding to the first type of interference are identified with arrows in FIGS. 1G-1H. In some examples, the first type of interference may correspond to interference of a network, such as a wireless network for first responders. In some examples, an interference signature of the plurality of interference signatures 171 may be representative of the first type of interference. Sites 1001, 1002, 1003 and 1004 may be grouped together (e.g., grouped into the group of wireless communication sites) based upon each wireless communication site, of the sites 1001, 1002, 1003 and 1004, being associated with an interference pattern corresponding to the first type of interference (and/or based upon the sites 1001, 1002, 1003 and 1004 being associated with related interference patterns corresponding to the interference signature).

FIGS. 1I-1J illustrate signal strength maps associated with wireless communication sites of a group of wireless communication sites (of the plurality of groups of wireless communication sites and/or the second plurality of groups of wireless communication sites) associated with interference patterns corresponding to a second type of interference. For example, the group of wireless communication sites may comprise sites 1005, 1006, 1007 and 1008. The signal strength maps associated with the group of wireless communication sites comprise signal strength maps 182 (left-side column of FIG. 1I) associated with wireless communication site 1005, signal strength maps 184 (right-side column of FIG. 1I) associated with wireless communication site 1006, signal strength maps 186 (left-side column of FIG. 1J) associated with wireless communication site 1007 and signal strength maps 188 (right-side column of FIG. 1J) associated with wireless communication site 1008. One or more frequency locations (e.g., PRB 30) of the interference patterns corresponding to the second type of interference are identified with arrows in FIGS. 1I-1J. In some examples, the second type of interference may correspond to narrowband interference. In some examples, an interference signature of the plurality of interference signatures 171 may be representative of the second type of interference (e.g., Interference Signature 2 shown in FIG. 1F may be representative of narrowband interference). Sites 1005, 1006, 1007 and 1008 may be grouped together (e.g., grouped into the group of wireless communication sites) based upon each wireless communication site, of the sites 1005, 1006, 1007 and 1008, being associated with an interference pattern corresponding to the second type of interference (and/or based upon the sites 1005, 1006, 1007 and 1008 being associated with related interference patterns corresponding to the interference signature).

FIGS. 1K-1L illustrate signal strength maps associated with wireless communication sites of a group of wireless communication sites (of the plurality of groups of wireless communication sites and/or the second plurality of groups of wireless communication sites) associated with interference patterns corresponding to a third type of interference. For example, the group of wireless communication sites may comprise sites 1009, 1010, 1011 and 1012. The signal strength maps associated with the group of wireless communication sites comprise signal strength maps 190 (left-side column of FIG. 1K) associated with wireless communication site 1009, signal strength maps 192 (right-side column of FIG. 1K) associated with wireless communication site 1010, signal strength maps 194 (left-side column of FIG. 1L) associated with wireless communication site 1011 and signal strength maps 196 (right-side column of FIG. 1L) associated with wireless communication site 1012. Frequency locations (e.g., PRBs 1-9) of the interference patterns corresponding to the third type of interference are identified with arrows in FIGS. 1K-1L. In some examples, the third type of interference may correspond to wideband interference. In some examples, an interference signature of the plurality of interference signatures 171 may be representative of the third type of interference. Sites 1009, 1010, 1011 and 1012 may be grouped together (e.g., grouped into the group of wireless communication sites) based upon each wireless communication site, of the sites 1009, 1010, 1011 and 1012, being associated with an interference pattern corresponding to the third type of interference (and/or based upon the sites 1009, 1010, 1011 and 1012 being associated with related interference patterns corresponding to the interference signature).

In some examples, one, some and/or all of the operations provided herein may be performed by an interference identification system.

According to some embodiments, a method is provided. The method includes determining signal strength information associated with a wireless communication site communicating with a UE; generating, based upon the signal strength information, an interference pattern representation of one or more interference patterns associated with the wireless communication site; and grouping a plurality of wireless communication sites, including the wireless communication site, into groups of wireless communication sites based upon interference pattern representations associated with the plurality of wireless communication sites, wherein the interference pattern representations include the interference pattern representation.

According to some embodiments, the method further includes determining, based upon the signal strength information, resource interference information indicative of a subset, of resources associated with signal strengths indicated by the signal strength information, classified as having interference, wherein generating the interference pattern representation is based upon the resource interference information.

According to some embodiments, determining the resource interference information includes comparing a signal strength, of the signal strengths, with a threshold; and classifying a resource, of the resources, associated with the signal strength as having interference based upon the signal strength not meeting the threshold.

According to some embodiments, the threshold is based upon the signal strengths associated with the resources.

According to some embodiments, generating the interference pattern representation includes generating, using an unsupervised machine learning model, a vector representation, wherein the interference pattern representation includes the vector representation.

According to some embodiments, grouping the plurality of wireless communication sites into the groups of wireless communication sites includes performing density-based clustering.

According to some embodiments, the method further includes determining locations of wireless communication sites of a group of wireless communication sites of the groups of wireless communication sites; and determining, based upon the locations, an interference location of a source of interference associated with the group of wireless communication sites.

According to some embodiments, the method further includes transmitting, to an interference mitigation system, an indication of the interference location and/or instructions to allocate one or more interference mitigation resources to the interference location.

According to some embodiments, signal strengths indicated by the signal strength information are uplink signal strengths and/or resources associated with the signal strengths are uplink resources.

According to some embodiments, the resources are PRBs.

According to some embodiments, the method further includes measuring signal strengths associated with resources over a period of time, wherein the signal strength information is based upon the signal strengths and the resources.

According to some embodiments, a non-transitory computer-readable medium, storing instructions that when executed perform operations, is provided. The operations include determining signal strength information associated with a wireless communication site communicating with a UE; determining, based upon the signal strength information, resource interference information indicative of a subset, of resources associated with signal strengths indicated by the signal strength information, associated with interference; generating, based upon the resource interference information, an interference pattern representation of one or more interference patterns associated with the wireless communication site; and grouping a plurality of wireless communication sites, including the wireless communication site, into groups of wireless communication sites based upon interference pattern representations associated with the plurality of wireless communication sites, wherein the interference pattern representations include the interference pattern representation.

According to some embodiments, determining the resource interference information includes comparing a signal strength, of the signal strengths, with a threshold; and classifying a resource, of the resources, associated with the signal strength as having interference based upon the signal strength not meeting the threshold.

According to some embodiments, the threshold is based upon the signal strengths associated with the resources.

According to some embodiments, generating the interference pattern representation includes generating, using an unsupervised machine learning model, a vector representation, wherein the interference pattern representation includes the vector representation.

According to some embodiments, grouping the plurality of wireless communication sites into the groups of wireless communication sites includes performing density-based clustering.

According to some embodiments, the operations further include determining locations of wireless communication sites of a group of wireless communication sites of the groups of wireless communication sites; and determining, based upon the locations, an interference location of a source of interference associated with the group of wireless communication sites.

According to some embodiments, the operations further include transmitting, to an interference mitigation system, an indication of the interference location and/or instructions to allocate one or more interference mitigation resources to the interference location.

According to some embodiments, the resources are uplink resources and/or the signal strengths are uplink signal strengths.

According to some embodiments, the resources are PRBs.

According to some embodiments, a device is provided. The device includes a processor configured to determine signal strength information associated with a wireless communication site communicating with a UE; generate, based upon the signal strength information, an interference pattern representation of one or more interference patterns associated with the wireless communication site; and group a plurality of wireless communication sites, including the wireless communication site, into groups of wireless communication sites based upon interference pattern representations associated with the plurality of wireless communication sites, wherein the interference pattern representations include the interference pattern representation.

Figure 3:
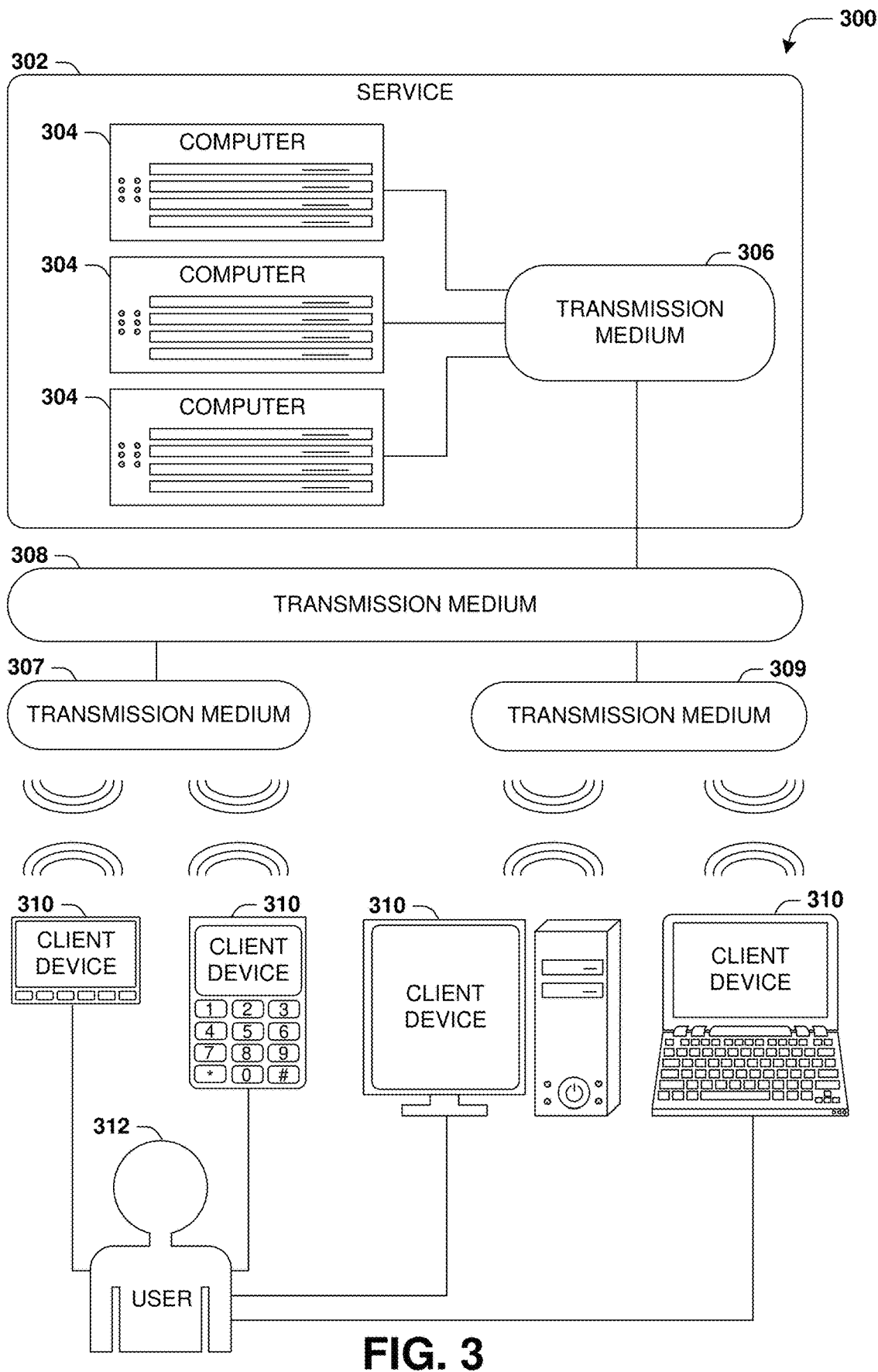
FIG. 3 is an illustration of a scenario involving various examples of transmission mediums that may be used to communicatively couple computers and clients.

FIG. 3 is an interaction diagram of a scenario 300 illustrating a service 302 provided by a set of computers 304 to a set of client devices 310 (e.g., UEs) via various types of transmission mediums. The computers 304 and/or client devices 310 may be capable of transmitting, receiving, processing, and/or storing many types of signals, such as in memory as physical memory states.

The computers 304 of the service 302 may be communicatively coupled together, such as for exchange of communications using a transmission medium 306. The transmission medium 306 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 302.

Likewise, the transmission medium 306 may comprise one or more sub-networks, such as may employ different architectures, may be compliant or compatible with differing protocols and/or may interoperate within the transmission medium 306. Additionally, various types of transmission medium 306 may be interconnected (e.g., a router may provide a link between otherwise separate and independent transmission medium 306).

In scenario 300 of FIG. 3, the transmission medium 306 of the service 302 is connected to a transmission medium 308 that allows the service 302 to exchange data with other services 302 and/or client devices 310. The transmission medium 308 may encompass various combinations of devices with varying levels of distribution and exposure, such as a public wide-area network and/or a private network (e.g., a virtual private network (VPN) of a distributed enterprise).

In the scenario 300 of FIG. 3, the service 302 may be accessed via the transmission medium 308 by a user 312 of one or more client devices 310, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 310 may communicate with the service 302 via various communicative couplings to the transmission medium 308. As a first such example, one or more client devices 310 may comprise a cellular communicator and may communicate with the service 302 by connecting to the transmission medium 308 via a transmission medium 307 provided by a cellular provider. As a second such example, one or more client devices 310 may communicate with the service 302 by connecting to the transmission medium 308 via a transmission medium 309 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 304 and the client devices 310 may communicate over various types of transmission mediums.

Figure 4:
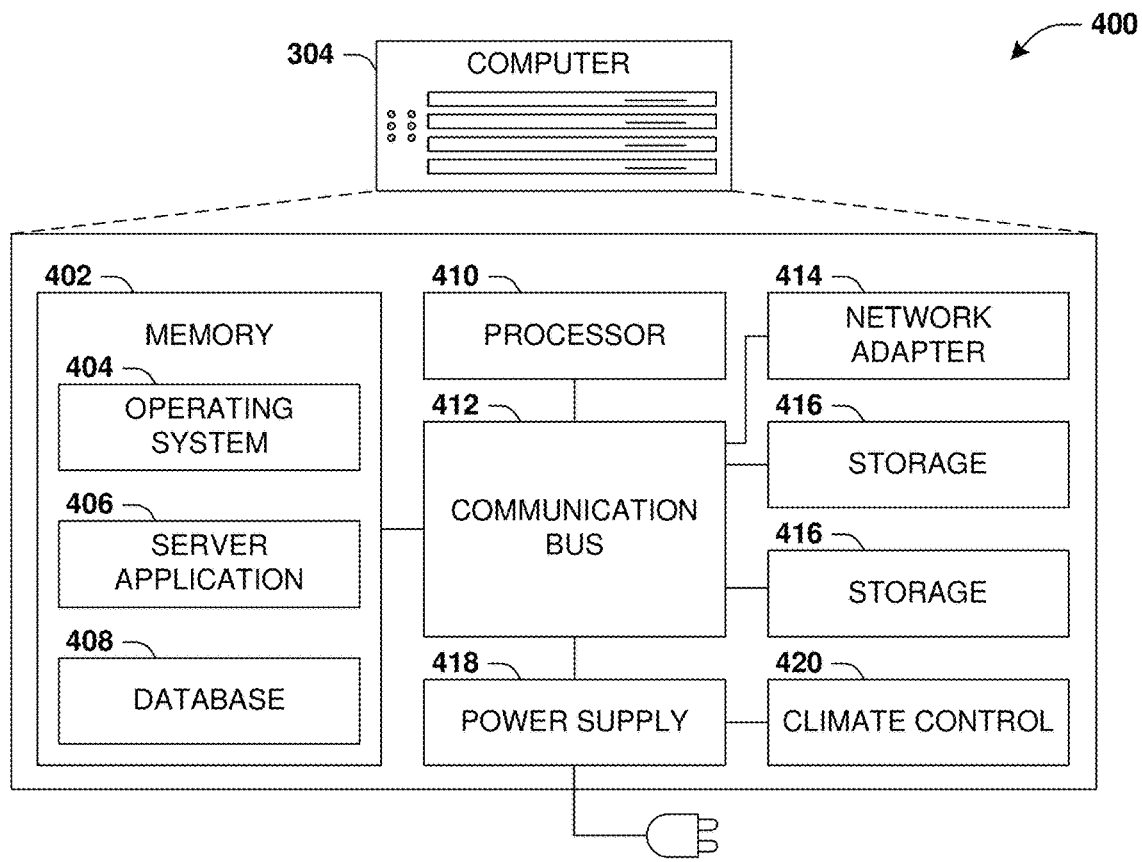
FIG. 4 is an illustration of a scenario involving an example configuration of a computer that may utilize and/or implement at least a portion of the techniques presented herein.

FIG. 4 presents a schematic architecture diagram 400 of a computer 304 that may utilize at least a portion of the techniques provided herein. Such a computer 304 may vary widely in configuration or capabilities, alone or in conjunction with other computers, in order to provide a service such as the service 302.

The computer 304 may comprise one or more processors 410 that process instructions. The one or more processors 410 may optionally include a plurality of cores; one or more coprocessors, such as a mathematics coprocessor or an integrated graphical processing unit (GPU); and/or one or more layers of local cache memory. The computer 304 may comprise memory 402 storing various forms of applications, such as an operating system 404; one or more computer applications 406; and/or various forms of data, such as a database 408 or a file system. The computer 304 may comprise a variety of peripheral components, such as a wired and/or wireless network adapter 414 connectible to a local area network and/or wide area network; one or more storage components 416, such as a hard disk drive, a solid-state storage device (SSD), a flash memory device, and/or a magnetic and/or optical disk reader.

The computer 304 may comprise a mainboard featuring one or more communication buses 412 that interconnect the processor 410, the memory 402, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 412 may interconnect the computer 304 with at least one other computer. Other components that may optionally be included with the computer 304 (though not shown in the schematic architecture diagram 400 of FIG. 4) include a display; a display adapter, such as a graphical processing unit (GPU); input peripherals, such as a keyboard and/or mouse; and a flash memory device that may store a basic input/output system (BIOS) routine that facilitates booting the computer 304 to a state of readiness.

The computer 304 may operate in various physical enclosures, such as a desktop or tower, and/or may be integrated with a display as an "all-in-one" device. The computer 304 may be mounted horizontally and/or in a cabinet or rack, and/or may simply comprise an interconnected set of components. The computer 304 may comprise a dedicated and/or shared power supply 418 that supplies and/or regulates power for the other components. The computer 304 may provide power to and/or receive power from another computer and/or other devices. The computer 304 may comprise a shared and/or dedicated climate control unit 420 that regulates climate properties, such as temperature, humidity, and/or airflow. Many such computers 304 may be configured and/or adapted to utilize at least a portion of the techniques presented herein.

Figure 5:
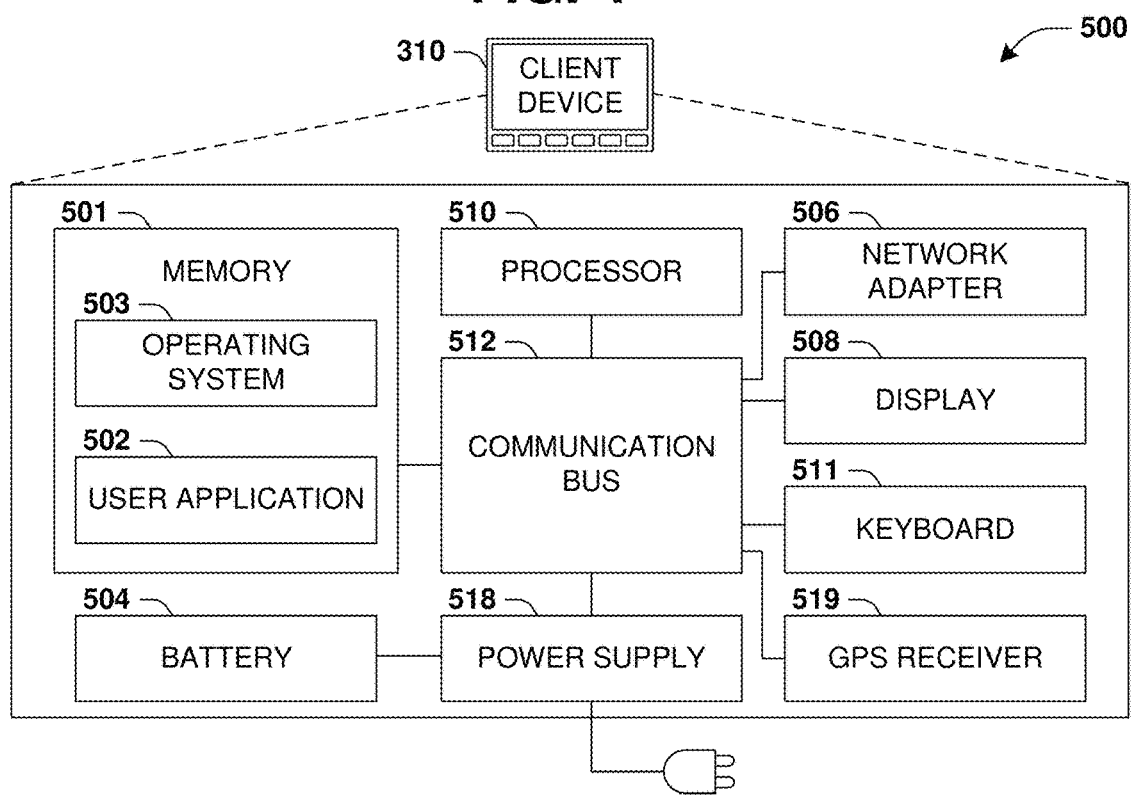
FIG. 5 is an illustration of a scenario involving an example configuration of a client that may utilize and/or implement at least a portion of the techniques presented herein.

FIG. 5 presents a schematic architecture diagram 500 of a client device 310 whereupon at least a portion of the techniques presented herein may be implemented. Such a client device 310 may vary widely in configuration or capabilities, in order to provide a variety of functionality to a user such as the user 312. The client device 310 may be provided in a variety of form factors, such as a desktop or tower workstation; an "all-in-one" device integrated with a display 508; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 310 may serve the user in a variety of roles, such as a workstation, kiosk, media player, gaming device, and/or appliance.

The client device 310 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The client device 310 may comprise memory 501 storing various forms of applications, such as an operating system 503; one or more user applications 502, such as document applications, media applications, file and/or data access applications, communication applications such as web browsers and/or email clients, utilities, and/or games; and/or drivers for various peripherals. The client device 310 may comprise a variety of peripheral components, such as a wired and/or wireless network adapter 506 connectible to a local area network and/or wide area network; one or more output components, such as a display 508 coupled with a display adapter (optionally including a graphical processing unit (GPU)), a sound adapter coupled with a speaker, and/or a printer; input devices for receiving input from the user, such as a keyboard 511, a mouse, a microphone, a camera, and/or a touch-sensitive component of the display 508; and/or environmental sensors, such as a global positioning system (GPS) receiver 519 that detects the location, velocity, and/or acceleration of the client device 310, a compass, accelerometer, and/or gyroscope that detects a physical orientation of the client device 310. Other components that may optionally be included with the client device 310 (though not shown in the schematic architecture diagram 500 of FIG. 5) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 310 to a state of readiness; and a climate control unit that regulates climate properties, such as temperature, humidity, and airflow.

The client device 310 may comprise a mainboard featuring one or more communication buses 512 that interconnect the processor 510, the memory 501, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 310 may comprise a dedicated and/or shared power supply 518 that supplies and/or regulates power for other components, and/or a battery 504 that stores power for use while the client device 310 is not connected to a power source via the power supply 518. The client device 310 may provide power to and/or receive power from other client devices.

Figure 6:
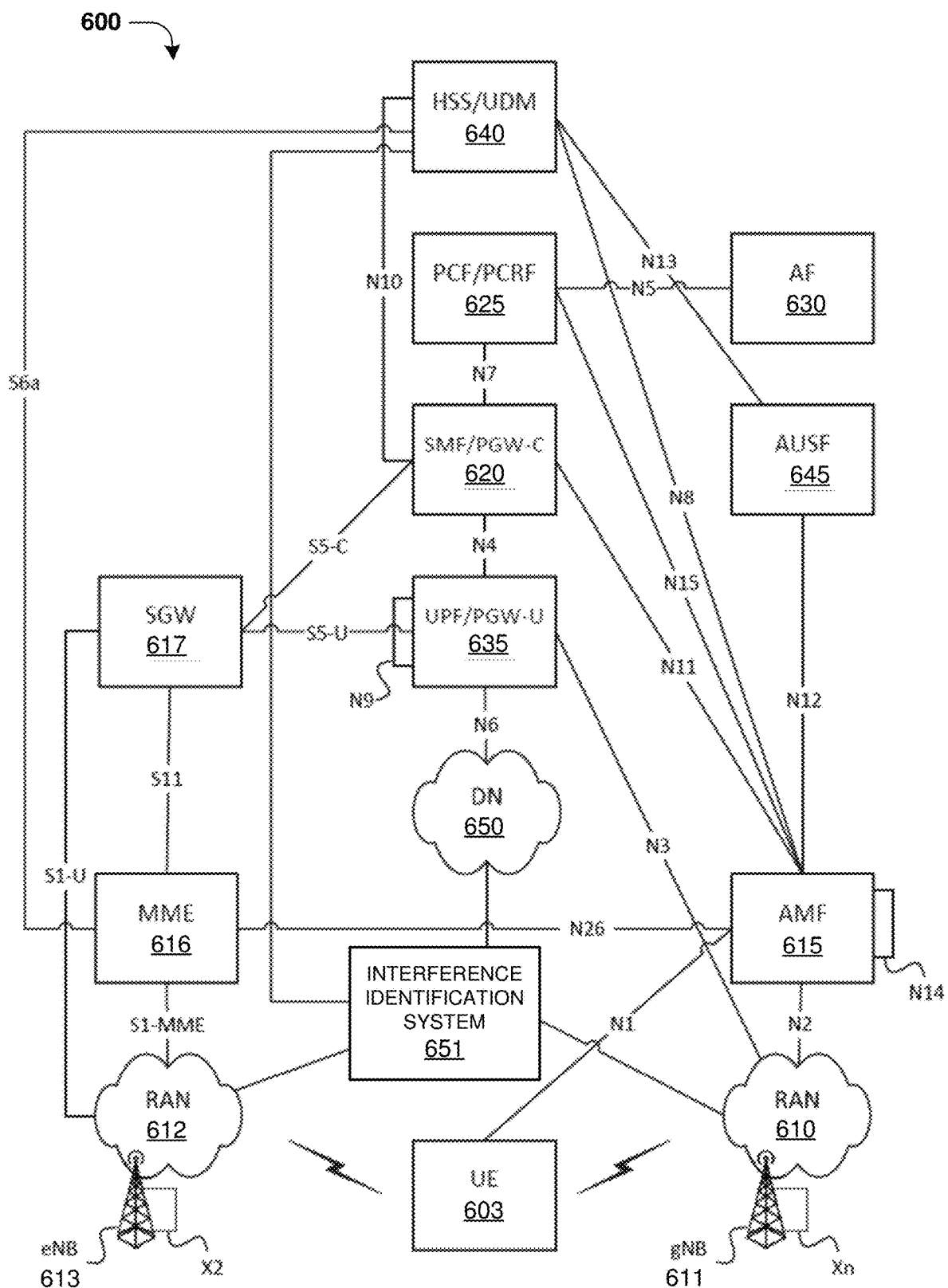
FIG. 6 is an illustration of an example environment in which at least a portion of the techniques presented herein may be utilized and/or implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 603, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as interference identification system 651.

The example shown in FIG. 6 illustrates one instance of each network component or function (e.g., one instance of SMF/PGW-C 620, PCF/PCRF 625, UPF/PGW-U 635, HSS/UDM 640, and/or 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or 645, while another slice may include a second instance of SMF/PGW-C 620, PCF/PCRF 625, UPF/PGW-U 635, HSS/UDM 640, and/or 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively and/or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 603 may include a computation and communication device, such as a wireless mobile communication device that is capable of communicating with RAN 610, RAN 612, and/or DN 650. UE 603 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 603 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 603 may communicate with one or more other elements of environment 600. UE 603 may communicate with RAN 610 via an air interface (e.g., as provided by gNB 611). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, AMF 615, and/or one or more other devices or networks) and may communicate the traffic to UE 603 via the air interface.

RAN 612 may be, or may include, a LTE RAN that includes one or more base stations (e.g., one or more eNBs 613), via which UE 603 may communicate with one or more other elements of environment 600. UE 603 may communicate with RAN 612 via an air interface (e.g., as provided by eNB 613). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, SGW 617, and/or one or more other devices or networks) and may communicate the traffic to UE 603 via the air interface.

AMF 615 may include one or more devices, systems, Virtualized Network Functions ("VNFs"), etc., that perform operations to register UE 603 with the 5G network, to establish bearer channels associated with a session with UE 603, to hand off UE 603 from the 5G network to another network, to hand off UE 603 from the other network to the 5G network, manage mobility of UE 603 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 603 with the EPC, to establish bearer channels associated with a session with UE 603, to hand off UE 603 from the EPC to another network, to hand off UE 603 from another network to the EPC, manage mobility of UE 603 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 603. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 603, from DN 650, and may forward the user plane data toward UE 603 (e.g., via RAN 610, SMF/PGW-C 620, and/or one or more other devices). In some embodiments, multiple UPFs 635 may be deployed (e.g., in different geographical locations), and the delivery of content to UE 603 may be coordinated via the N9 interface (e.g., as denoted in FIG. 6 by the line marked "N9" originating and terminating at UPF/PGW-U 635). Similarly, UPF/PGW-U 635 may receive traffic from UE 603 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 603.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 603 may communicate, through DN 650, with data servers, other UEs UE 603, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 603 may communicate.

The interference identification system 651 may include one or more devices, systems, VNFs, etc., that perform one or more operations described herein. For example, the interference identification system 651 may determine signal strength information associated with wireless communication sites, generate interference pattern representations associated with the wireless communication sites based upon the signal strength information, group the wireless communication sites into groups of wireless communication sites based upon the interference pattern representations, determine one or more interference locations of an interference source associated with a group of wireless communication sites, and/or deploy one or more interference mitigation resources to the one or more interference locations.

Figure 7:
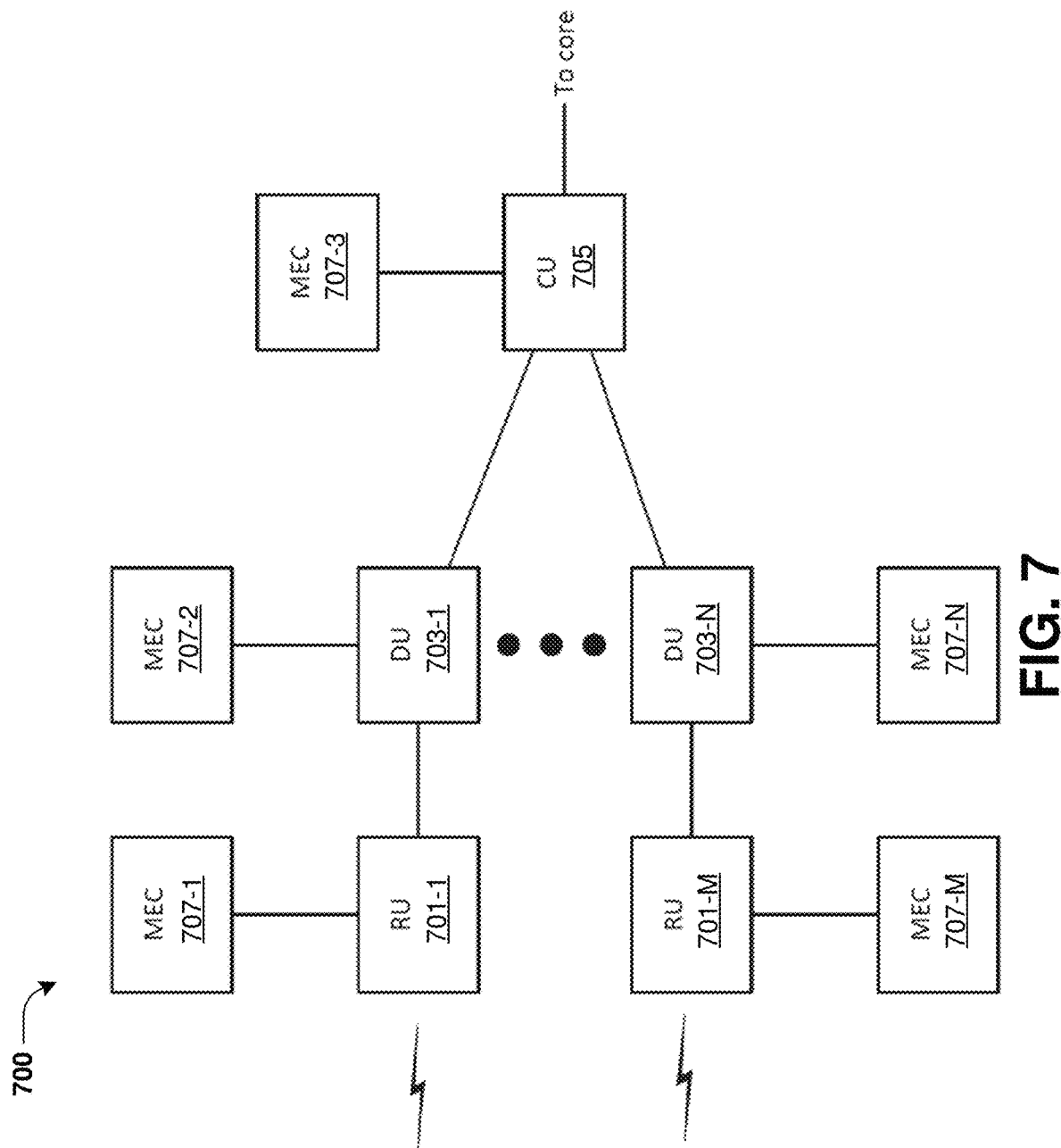
FIG. 7 is an illustration of an example network that may utilize and/or implement at least a portion of the techniques presented herein.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs UE 603 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based upon the RLC packets) on the traffic received from DUs 703.

In accordance with some embodiments, CU 705 may receive downlink traffic (e.g., traffic from the core network) for a particular UE 603, and may determine which DU(s) 703 should receive the downlink traffic. DU 703 may include one or more devices that transmit traffic between a core network (e.g., via CU 705) and UE 603 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 603.

RU 701 may include hardware circuitry (e.g., one or more RF transceivers, antennas, radios, and/or other suitable hardware) to communicate wirelessly (e.g., via an RF interface) with one or more UEs UE 603, one or more other DUs 703 (e.g., via RUs 701 associated with DUs 703), and/or any other suitable type of device. In the uplink direction, RU 701 may receive traffic from UE 603 and/or another DU 703 via the RF interface and may provide the traffic to DU 703. In the downlink direction, RU 701 may receive traffic from DU 703, and may provide the traffic to UE 603 and/or another DU 703.

RUs 701 may, in some embodiments, be communicatively coupled to one or more Multi-Access/Mobile Edge Computing ("MEC") devices, referred to sometimes herein simply as ("MECs") 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 603, via a respective RU 701.

For example, RU 701-1 may route some traffic, from UE 603, to MEC 707-1 instead of to a core network (e.g., via DU 703 and CU 705). MEC 707-1 may process the traffic, perform one or more computations based upon the received traffic, and may provide traffic to UE 603 via RU 701-1. In this manner, ultra-low latency services may be provided to UE 603, as traffic does not need to traverse DU 703, CU 705, and an intervening backhaul network between DU network 700 and the core network. In some embodiments, MEC 707 may include, and/or may implement some or all of the functionality described above with respect to at least one of the interference identification system 651, the first wireless communication site 106, the UE 102, the interference identification module 112, the classification system 130, the clustering module 144, etc.

Figure 8:
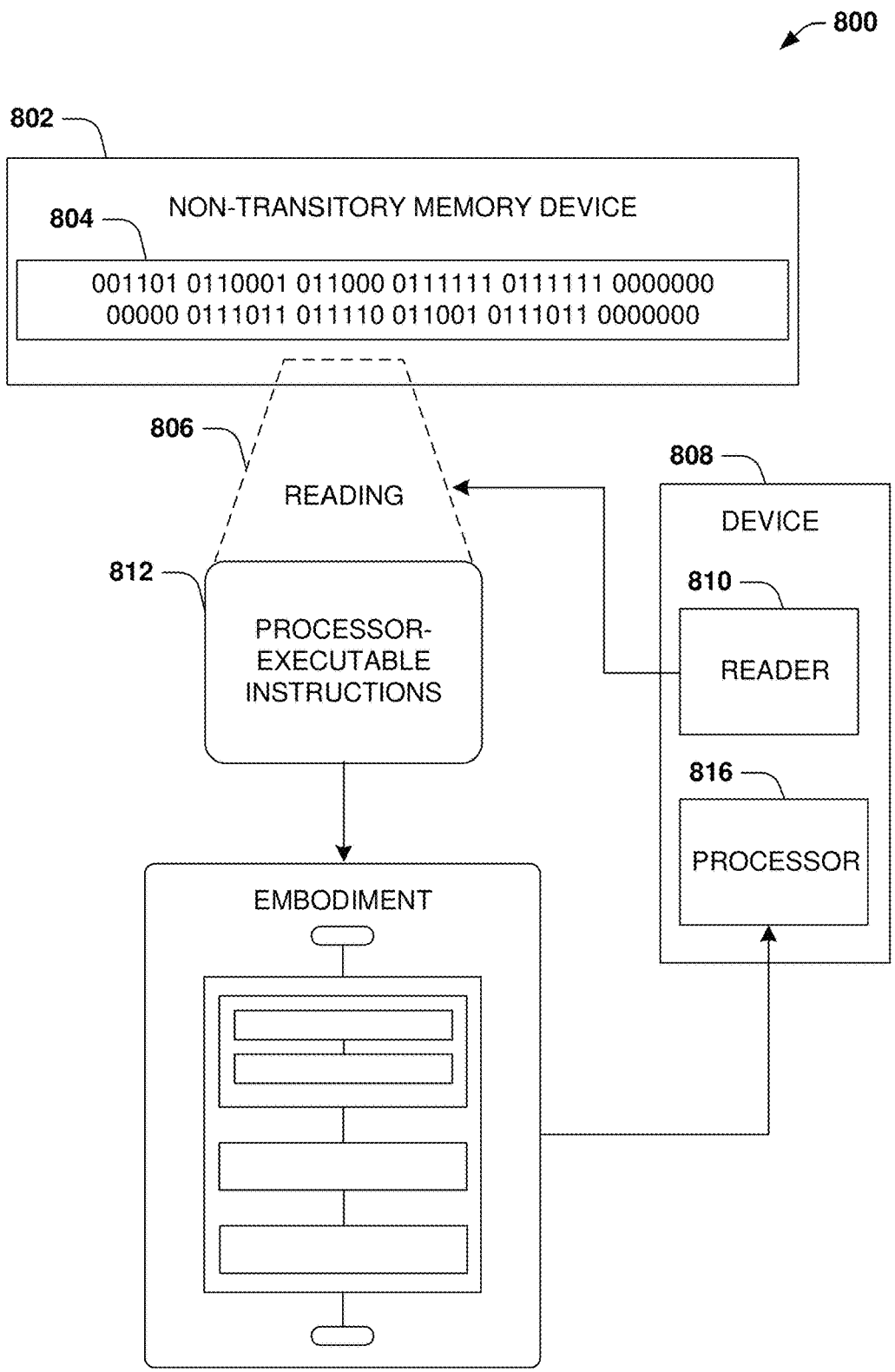
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, for example. In some embodiments, the processor-executable instructions 812 are configured to cause implementation of a system, such as at least some of the example system 101 of FIGS. 1A-1L, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    determining groups of wireless communication sites, wherein wireless communication sites of each group are associated with related interference pattern representations;
    determining locations of wireless communication sites of a group of wireless communication sites of the groups of wireless communication sites; and
    determining, based upon the locations, an interference location of a source of interference associated with the group of wireless communication sites.

2. The method of claim 1, further comprising:
    transmitting, to an interference mitigation system, an indication of the interference location.

3. The method of claim 1, further comprising:
    transmitting, to an interference mitigation system, instructions to allocate one or more interference mitigation resources to the interference location.

4. The method of claim 1, further comprising:
    determining signal strength information associated with a wireless communication site communicating with a user equipment (UE); and
    generating, based upon the signal strength information, an interference pattern representation associated with the wireless communication site,
    wherein the interference pattern representation is associated with the group of wireless communication sites.

5. The method of claim 4, further comprising:
    determining, based upon the signal strength information, resource interference information indicative of a subset, of resources associated with signal strengths indicated by the signal strength information, classified as having interference,
    wherein generating the interference pattern representation is based upon the resource interference information.

6. The method of claim 5, wherein determining the resource interference information comprises:
    comparing a signal strength, of the signal strengths, with a threshold; and
    classifying a resource, of the resources, associated with the signal strength as having interference based upon the signal strength not meeting the threshold.

7. The method of claim 6, wherein:
    the threshold is based upon the signal strengths associated with the resources.

8. The method of claim 1, further comprising:
    generating, using an unsupervised machine learning model, an interference pattern representation comprising a vector representation,
    wherein the interference pattern representation is associated with the group of wireless communication sites.

9. A non-transitory computer-readable medium storing instructions that when executed perform operations comprising:
    determining signal strength information associated with a wireless communication site communicating with a user equipment (UE);
    determining, based upon the signal strength information, resource interference information indicative of a subset, of resources associated with signal strengths indicated by the signal strength information, associated with interference; and
    generating, based upon the resource interference information, an interference pattern representation of one or more interference patterns associated with the wireless communication site.

10. The non-transitory computer-readable medium of claim 9, wherein determining the resource interference information comprises:
    comparing a signal strength, of the signal strengths, with a threshold; and
    classifying a resource, of the resources, associated with the signal strength as having interference based upon the signal strength not meeting the threshold.

11. The non-transitory computer-readable medium of claim 10, wherein:
    the threshold is based upon the signal strengths associated with the resources.

12. The non-transitory computer-readable medium of claim 9, wherein generating the interference pattern representation comprises:
    generating, using an unsupervised machine learning model, a vector representation,
    wherein the interference pattern representation comprises the vector representation.

13. The non-transitory computer-readable medium of claim 9, the operations further comprising:
    determining locations of wireless communication sites of a group of wireless communication sites; and
    determining, based upon the locations, an interference location of a source of interference associated with the group of wireless communication sites.

14. The non-transitory computer-readable medium of claim 13, the operations further comprising:
    transmitting, to an interference mitigation system, at least one of:
        an indication of the interference location; or
        instructions to allocate one or more interference mitigation resources to the interference location.

15. The non-transitory computer-readable medium of claim 9, wherein at least one of:
    the resources are uplink resources; or
    the signal strengths are uplink signal strengths.

16. A device comprising:
    a processor configured to:

determine an interference pattern representation associated with a wireless communication site communicating with a user equipment (UE); and determine groups of wireless communication sites, wherein wireless communication sites of each group are associated with related interference pattern representations, wherein the interference pattern representation is associated with a group of wireless communication sites of the groups of wireless communication sites.

17. The device of claim 16, wherein determining the interference pattern representation comprises:

generating, using an unsupervised machine learning model, a vector representation, wherein the interference pattern representation comprises the vector representation.

18. The device of claim 16, wherein the processor is further configured to:

determine locations of wireless communication sites of the group of wireless communication sites; and determine, based upon the locations, an interference location of a source of interference associated with the group of wireless communication sites.

19. The device of claim 18, wherein the processor is further configured to:

transmit, to an interference mitigation system, an indication of the interference location.

20. The device of claim 18, wherein the processor is further configured to:

transmit, to an interference mitigation system, instructions to allocate one or more interference mitigation resources to the interference location.

* * * * *